(12) United States Patent
Claes et al.

(10) Patent No.: US 11,352,774 B2
(45) Date of Patent: Jun. 7, 2022

(54) SANITARY APPLIANCE COMPRISING A SENSOR CIRCUIT AND USE THEREOF

(71) Applicant: IPee NV, Wilrijk (BE)

(72) Inventors: Victor Augusta P Claes, Wommelgem (BE); Bart Geraets, Wilrijk (BE); Jan Schoeters, Kapellen (BE)

(73) Assignee: IPEE NV, Antwerp (BE)

( * ) Notice: Subject to any disclaimer, the term of this patent is extended or adjusted under 35 U.S.C. 154(b) by 0 days.

(21) Appl. No.: 16/967,749

(22) PCT Filed: Feb. 6, 2019

(86) PCT No.: PCT/EP2019/052945
§ 371 (c)(1),
(2) Date: Aug. 6, 2020

(87) PCT Pub. No.: WO2019/154881
PCT Pub. Date: Aug. 15, 2019

(65) Prior Publication Data
US 2020/0370288 A1    Nov. 26, 2020

(30) Foreign Application Priority Data
Feb. 6, 2018    (EP) .................................... 18155364

(51) Int. Cl.
*E03D 5/10*    (2006.01)
*G01N 27/07*    (2006.01)

(52) U.S. Cl.
CPC .............. *E03D 5/105* (2013.01); *G01N 27/07* (2013.01)

(58) Field of Classification Search
CPC ....... E03D 5/105; G01N 27/07; G01N 27/045
See application file for complete search history.

(56) References Cited

U.S. PATENT DOCUMENTS 3,368,225 A    2/1968  Takechi et al.
3,482,268 A *  12/1969  Teshima ................... E03D 5/10
                                                4/304
(Continued)

FOREIGN PATENT DOCUMENTS

CN    101230592 A    7/2008
DE    3228061 A1    2/1983
(Continued)

OTHER PUBLICATIONS

International Searching Authority; International search report and notification of transmittal of the international search report and written opinion of the international searching authority for International Patent Application No. PCT/EP2019/052945 dated May 6, 2019.

(Continued)

*Primary Examiner* — Janie M Loeppke
(74) *Attorney, Agent, or Firm* — McDonnell Boehnen Hulbert & Berghoff LLP

(57) ABSTRACT

The sanitary appliance (400) comprises a receptacle (410) and a tube (420) provided with a tube wall (401, 402) and configured to contain—in use—an aqueous solution (1000) and a sensor circuit (105) for sensing inflow of matter into the sanitary appliance (400), wherein the sensor circuit (105) comprises a primary circuit and a secondary circuit that are mutually inductively coupled, wherein the inductively coupled secondary circuit includes a capacitive sensor comprising a first and a second electrode (101, 102), each of which are configured to be in use at least partially (101, 192) in contact with the aqueous solution (1000), which constitutes a medium of the capacitive sensor.

20 Claims, 14 Drawing Sheets

(56) References Cited

U.S. PATENT DOCUMENTS

| | | |
|---|---|---|
| 2006/0005312 A1 | 1/2006 | Reddy et al. |
| 2010/0088812 A1 | 4/2010 | Chen et al. |
| 2015/0020298 A1* | 1/2015 | Hsu .................. E03D 13/00 4/305 |
| 2015/0292912 A1 | 10/2015 | Claes et al. |
| 2017/0160220 A1* | 6/2017 | Young .................. G08C 17/00 |

FOREIGN PATENT DOCUMENTS

| | | |
|---|---|---|
| EP | 0750181 A1 | 12/1996 |
| EP | 3101396 A2 | 12/2016 |
| GB | 1509600 A | 5/1978 |
| WO | 2009092201 A1 | 7/2009 |
| WO | 2014076284 A1 | 5/2014 |

OTHER PUBLICATIONS

International Searching Authority; Written opinion of the International Searching Authority for International Patent Application No. PCT/EP2019/052945 dated May 6, 2019.

\* cited by examiner

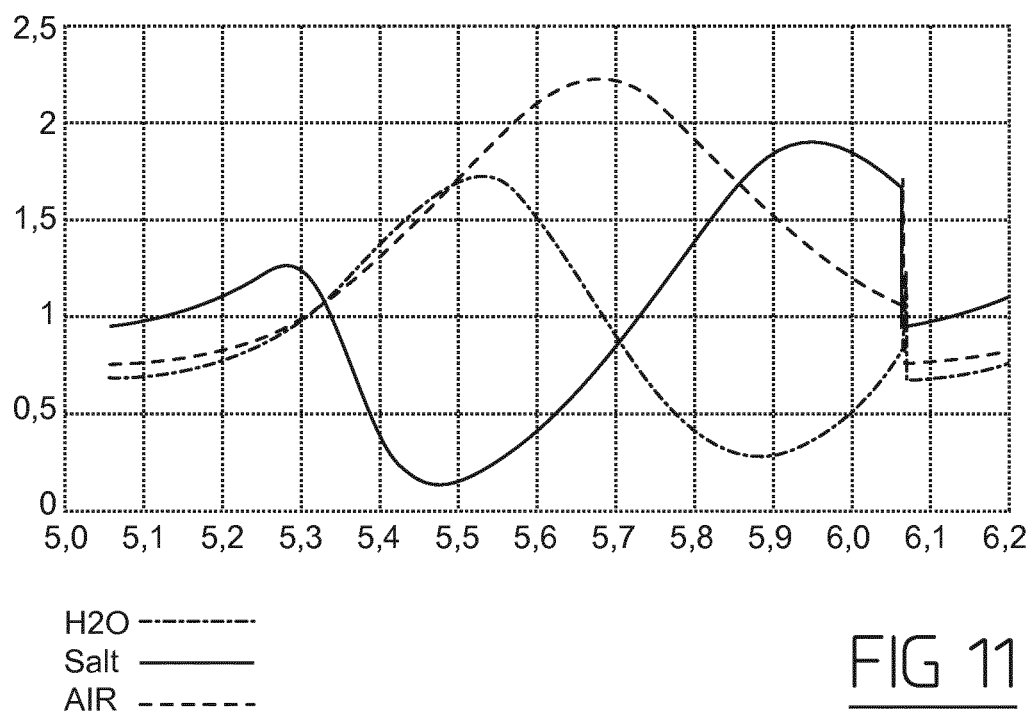
FIG 11
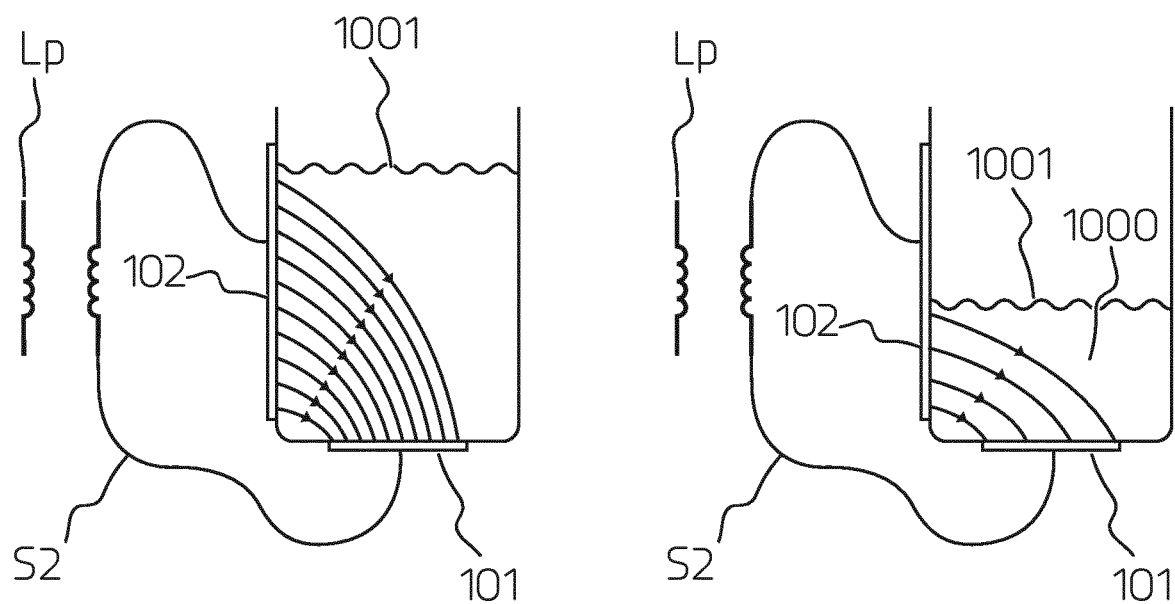
FIG 12 (b)
FIG 12 (a)

— 240 ml

H2O - - - - - -
Salin ———
AIR - - - - -

SANITARY APPLIANCE COMPRISING A SENSOR CIRCUIT AND USE THEREOF

FIELD OF THE INVENTION

The invention relates to a sanitary appliance comprising a sensor circuit for sensing of an electrical conductivity of an aqueous solution or variation thereof within the sanitary appliance, comprising:
- a signal generator configured for generating sensing signals;
- a capacitive sensor comprising a first and a second electrode, wherein the aqueous solution constitutes a medium of the capacitive sensor,
- an output circuit for conditioning a response transmitted from the capacitive sensor into a output signal.

The invention further relates to a method of sensing an electrical conductivity of an aqueous solution or variation thereof within a sanitary appliance, comprising the steps of:
- generating a sensing signals;
- Transmitting said signals to a capacitive sensor, wherein the aqueous solution constitutes a medium of the capacitive sensor;
- Conditioning said frequency-dependent response from the capacitive sensor into an output signal.

BACKGROUND OF THE INVENTION

Examples of sanitary appliances are urinals, home toilets, showers and wash basins. Typically, such a sanitary appliance comprises a receptacle and a tube for removal of water (more correctly an aqueous solution) from a flow surface of the receptacle. The tube may be provided with a siphon. Water standing in the siphon constitutes a barrier against flow of—unpleasant—odors from a downstream pipe into the room in which the sanitary appliance is located. Thus, there is in use a water surface present in said tube.

It is known to use a capacitive or another sensor in sanitary appliances, for instance from WO2014/076284A1 and DE3228061. This is done so as to sense the inflow of urine, particularly in urinals, so as to control flushing. While flushing in a home toilet is typically initiated in that a user pushes a button, this is less common in urinals in public toilets and toilets that are used by a large number of people. DE3228061 discloses the use of a capacitive sensor located in a siphon. This capacitive sensor is coupled to an output circuit in a controller. WO2014/0076284 discloses the use of a resonant circuit to sense inflow of urine in the receptacle. The resonant circuit typically comprises a capacitor and an inductor, both of which are located at a flow surface of the receptacle, while separated from the flow surface through the wall of the receptacle.

The advantage of using a resonant circuit as a sensor is that the sensing becomes less sensitive on dirt and other contamination present at the flow surface. Such dirt typically contains a mixture of urine and calcium, which is an effective dielectric. The presence of such dirt layer thus increases the capacitance and hence leads to a shift in the capacitance values.

A disadvantage of the sensor known from WO2014/076284A1 is a limited suitability for other locations in the sanitary appliance than on the receptacle. A disadvantage of the sensor known from DE3228061 is the sensitivity. Furthermore, also in a siphon, dirt may adhere to a surface, resulting in a shift in capacitance.

SUMMARY OF THE INVENTION

It is therefore an object of the invention to provide a sanitary appliance comprising an improved sensor circuit suitable for reliably and accurately sensing of the electrical conductivity of an aqueous solution, or variation thereof, particularly in areas remote from the flow surface in the receptacle.

It is a further object to provide a reliable method of sensing.

It is again a further object to provide a sanitary appliance comprising an improved sensor circuit configured for detecting inflow of solid matter as distinguished from liquid matter.

According to a first aspect, the invention provides a sanitary appliance comprising a tube provided with a tube wall and configured to contain—in use—an aqueous solution and a sensor circuit for sensing inflow of matter into the sanitary appliance, wherein the sensor circuit comprises a primary circuit and a secondary circuit that are mutually inductively coupled, wherein the inductively coupled secondary circuit includes a capacitive sensor comprising a first and a second electrode, each of which are configured to be in use at least partially in contact with the aqueous solution, which constitutes a medium of the capacitive sensor. The primary circuit herein comprises a resonant tank circuit comprising at least one capacitor and an inductor coupled in parallel to ground, wherein the secondary circuit is coupled to the primary circuit via the inductor of the resonant tank circuit. Said sensor circuit may for instance comprise (1) the primary circuit comprising a signal generator configured for generating signals in a predefined frequency range above 1 MHz; (2) the secondary circuit comprising the capacitive sensor, and (3) an output circuit for conditioning a response transmitted from the secondary circuit into an output signal, which is suitably part of the primary circuit.

According to a second aspect, the invention provides a method of sensing an electrical conductivity of an aqueous solution or variation thereof in a sanitary appliance of the invention, comprising the steps of:
- Generating one or more signals in a primary circuit of a sensor circuit;
- Transmitting said one or more signals to a secondary circuit via inductive coupling, which secondary circuit comprises a capacitive sensor, wherein the aqueous solution constitutes a medium of the capacitive sensor, wherein a signal transmission to the secondary circuit has an effectiveness dependent on the electrical conductivity of the aqueous solution, thus defining a response, wherein preferably said transmission is carried out with a coupling factor in the range of 0.05 to 0.3, preferably 0.1 to 0.2,
- Conditioning said frequency-dependent response from the secondary circuit into an output signal.

According to a further aspect, the invention relates to the use of a sensor circuit for sensing of an electrical conductivity of an aqueous solution or variation thereof in a sanitary appliance of the invention, said aqueous solution being present in said sanitary appliance, comprising (1) a signal generator; (2) a capacitive sensor comprising a first and a second electrode, wherein the aqueous solution within a chamber and/or tube of the sanitary appliance constitutes a medium of the capacitive sensor, and (3) an output circuit for conditioning a response transmitted from the secondary circuit into an output signal. According to the invention, the signal generator is part of a primary circuit and the capacitive sensor is part of a secondary circuit which is inductively coupled to the primary circuit. Typically, the output circuit is also part of the primary circuit.

According to again a further aspect, the invention relates to the use of a sensor circuit as defined herein (for instance directly below) in a sanitary appliance comprising a—removal—tube with a tube wall and configured for keeping an aqueous solution with a water surface, wherein the use comprises the sensing of a variation of the location of said water surface adjacent the tube wall. Such variation is for instance a transient variation. It may be alternatively a permanent or semi-permanent variation. Preferably, a controller is used in combination with the sensor circuit to process output signals defining said sensed variations into information on a state of the sanitary appliance. One state of the sanitary appliance linked to a transient variation of the location of the water surface is inflow of solid matter rather than liquid matter. One state of the sanitary appliance linked to a semi-permanent or permanent variation (i.e. change) in the location (i.e. height) of the water surface is a blockage of a pipe downstream of the sensed location.

According to again a further aspect, the invention relates to a sensor circuit, comprising: (1) a signal generator configured for generating sensing signals; (2) a capacitive sensor comprising a first and a second electrode, wherein the electrolyte solution constitutes a medium of the capacitive sensor, (3) an output circuit for conditioning a response transmitted from the secondary circuit into an output signal. Herein, the signal generator is part of a primary circuit and the capacitive sensor is part of a secondary circuit which is inductively coupled to the primary circuit. The primary circuit comprises a resonant tank circuit comprising at least one capacitor and an inductor coupled in parallel to ground, wherein the secondary circuit is coupled to the primary circuit via the inductor of the resonant tank circuit. Suitably, the output circuit is also part of the primary circuit.

According to the invention, the sensor is operated by increasing a load to the primary circuit, i.e. by means of energy transmission to a secondary circuit. Said load increase is however dependent on the conductivity of the aqueous solution that constitutes part of the secondary circuit. Thus, the sensitivity of the sensor operates in a two-fold manner: first of all, via a need to transfer energy to the secondary circuit, via an inductive coupling, and secondly on the measured capacitance. The inductive coupling has an efficiency that depends on the load in the secondary circuit, and due to the variation of the capacitance, this load is also variable.

Herein, the sensor circuit is configured so that resonance may occur under predefined conditions. A high load of the secondary circuit is obtained, when the secondary circuit is in a state of resonance. The energy absorption into the secondary circuit is at its maximum, when resonance occurs both in the primary and the secondary circuit. The background is that the energy transmission via inductive coupling strongly depends on the extent of resonance between the primary circuit and the secondary circuit. In this manner, the configuration of the sensor circuit allows a two-step sensitivity: as a first step, resonance is to occur in the primary circuit so as to achieve absorption of energy. As a second step, the energy transmission will increase sharply when changing the frequency towards a state of resonance in the secondary circuit. Such two-step sensitivity leads thereto that the sensing is not or not significantly disturbed by capacitive effects of a dirt layer in the sanitary appliance. These dirt layers are known to cause problems with pure capacitive sensing. Furthermore, the two-step sensitivity allows sensing of transient variations. The effect can be named 'resonance amplification', and is herein used to express a situation, in which a high-frequency signal generated by the signal generator leads to a state of resonance in that the sensor arrives at a state of resonance, due to the capacitance and the inductance of the circuit of which the capacitive sensor forms part.

More particularly, inductors required for the inductive coupling between primary and secondary circuit may be part of resonant tank circuits in the primary and the secondary circuit.

In a preferred embodiment, the secondary circuit comprises an inductor in addition to the capacitive sensor, which inductor is configured for the inductive coupling, which inductor and which capacitive sensor jointly constitute a resonant tank at a predefined conductivity of the aqueous solution. This implementation of a resonant tank is deemed advantageous and effective. The secondary circuit is a closed circuit, without any connection to ground. It is preferably designed to include a few components only. Most preferably, the secondary circuit includes the inductor and the capacitive sensor and any optional resistors as its only functional components. The addition of any further functional components such as extra capacitors, transistors and/or diodes is not deemed beneficial so as to obtain an adequate output signal. Nevertheless, it is to be understood that—parasitic—resistances, capacitances and inductances may be present, such as for instance capacitive effects of the—dielectric material—wall of the chamber or tube, at an outside of which the electrodes are present. Cables between the inductor and the capacitor may constitute a resistance, and also the aqueous solution has a resistance. Suitably, the secondary circuit has been designed in a manner to take account of such parasitic effects, so that resonance can be obtained under pre-defined and desired conditions.

In this embodiment, in a state of resonance of the secondary circuit, merely the resistive component of the capacitive sensor remains. When both the primary and the secondary circuit are in a state of resonance—which is intentionally the case when the secondary circuit is in a state of resonance, the imaginary contributions to the resonant tank circuit of the primary circuit also is cancelled. This response, or the output signal derived therefrom can be easily identified from a series of signals, in a controller, that is preferably embodied as a microcontroller integrated circuit. In practice the response will be seen as a dip in frequency response of the secondary circuit when in a state of resonance, as the energy absorption in the circuit is at its maximum.

In a further advantageous embodiment, the resonant tank circuit of the primary circuit is configured to have a resonance frequency defined at a predefined conductivity of the aqueous solution, wherein a ratio of the resonance frequencies of the resonant tank circuit and the secondary circuit is in the range of 0.5 to 2.0. More preferably, the ratio of the resonance frequencies is 0.8 to 1.3. The predefined conductivity of the aqueous solution is for instance chosen as that of a physiological solution (0.9 wt % NaCl, 0.155 mole/liter). It has been found that upon increase of the electrical conductivity of the medium, which typically corresponds to an increased concentration of the aqueous solution, the dip in frequency response of the secondary circuit at the resonance frequency becomes deeper.

More preferably, the ratio of resonance frequencies is in the range of 0.9 to 1.1. It is understood that resonance frequencies do not need to match exactly, so as to ensure that the secondary circuit may start resonating and therewith absorbing energy within a frequency range close to the resonance frequency of the primary circuit. Moreover, the primary circuit may be provided with a larger bandwidth than the secondary circuit. The larger bandwidth is for instance embodied by way of the Q-factor, and/or that the primary circuit comprises a capacitive transformer circuit.

The capacitive sensor electrodes may be configured on at least one wall of a removal tube of the sanitary appliance and/or on at least one wall of a chamber defining a volume of said aqueous solution. Such a chamber is for instance a siphon. As known, in toilets, liquid is removed out of the receptacle to a removal tube. Downstream thereof, a siphon is present, so as to provide a liquid layer that prevents odors from further downstream to enter the room via the toilet.

Preferably, the sensor electrodes are arranged not to get into direct contact with the aqueous solution. More particularly, the sensor electrodes are each arranged in a cavity within or on a wall such that said wall is present between said sensor electrodes and the aqueous solution inside said tube or chamber. In this manner, the electrodes are outside the aqueous solution and there is no risk for contamination of the aqueous solution through the process of inserting the electrodes. Several implementations are envisaged for the sensor electrodes In an advantageous implementation, the first and second electrodes are arranged as rings at mutually different axial positions around the tube, or alternatively the chamber. The rings preferably extend circumferential to the tube, though a partial extension around the tube is not excluded. This implementation is found to provide an adequate response in a large conductivity range.

In another implementation, the first and the second electrode are axially extending strips, at different angular positions. The latter arrangement is deemed most suitable for sensing of relatively low concentrations, such as concentrations lower than that of a physiological salt solution, more preferably at concentrations of at most 10% of a physiological salt solution.

In again a further implementation, the first and second electrode jointly constitute an interdigitated pair of electrodes, each having fingers that are arranged in a row in an alternating order. Such an interdigitated design creates a relatively large capacitor area on a comparatively small surface area.

In one further implementation, the capacitive sensor may contain a first and a second pair of electrodes that are connected in parallel. This implementation may eliminate variations in conductivity within the tube of chamber, for instance due to differences in flow within the tube of chamber. As will be known to the skilled person, the capacitive contributions of two capacitors in parallel may be summed up. In a further implementation hereof, a switch is present so that the contributions of the parallel capacitive elements can be selectively switched on or off. This implementation is deemed beneficial so as to allow sensitive measurements of significantly different conductivities, but also to enable elimination of one of the capacitive elements in case of any systematic error, for instance due to local contamination.

In a further embodiment, the primary circuit and the secondary circuit are mutually inductively coupled with a coupling coefficient in the range of 0.05 to 0.3, preferably from 0.1 to 0.2. The coupling factor is known from the theory of transformers. In conventional iron-core transformers, the coupling coefficient is almost one. The preferred coupling in the invention is a so-called loose coupling. The less than ideal coupling results in damping of the response of the secondary circuit. That is deemed beneficial for filtering out noise. An optimal coupling coefficient at a resonance frequency around 10 MHz is in the range of 0.13-0.18. Lower coupling factors in the range of 0.08-0.12 are feasible in an alternative embodiment with lower resonance frequencies, for instance in the range of 5-8 MHz. The coupling coefficient is for instance tuned by means of the mutual orientation and distance of the inductors in the primary and the secondary circuit. Furthermore permittivity may be improved if so desired with the use of a core material. The inductors are for instance SMD-type inductors that are assembled on a circuit board. Alternatively, use can be made of planar inductors of which at least one is integrated into the circuit board.

Thus, in a further implementation the inductors configured for the inductive coupling between the primary and secondary circuit are arranged in or on a substrate such as a printed circuit board, which is arranged remote from the fluid chamber and/or tube. There is thus no need that the electronics of the sensor circuit, including for instance an oscillator, a controller and a dedicated circuit board need assembly in the vicinity of the fluid chamber and/or tube. This facilitates use in many applications, wherein the tube or chamber is not or not easily accessible. Furthermore, it reduces the risk that the electronics are damaged due to contact with the aqueous solution. Preferably, the distance between the substrate and the fluid chamber and/or tube is at most 1 meter, more preferably at most 50 cm.

In again a further embodiment, the resonant tank circuit of the primary circuit is configured to have a quality factor in the range of 1-50, more preferably 2-10, such as 4-7. This quality factor is deemed to be relatively low and has the effect that a peak in the resonance is flattened. Such a flattening of the resonance peak facilitates a correct reading of the sensing result. The electrical explanation is that the flattened peak (or curve) compensates the shift of the resonance frequency due to changes in the capacitance. The quality factor is furthermore preferably not too low, not lower than 3, more preferably at least 5. Good results have been obtained with a quality factor in the range of 10-20. Therewith, the resonant tank circuit acts as a filter of a first harmonic square wave originating from the signal generator, in the embodiment wherein the signal generator comprises a buffer, such as a NAND-unit. The NAND-unit is in itself advantageous so as to shield the oscillator in the signal generator from the tank circuit and the output circuit. The NAND then turns the sinusoidal signal from the oscillator into a square wave. The sufficiently high quality factor ensures that merely the first harmonic (i.e. the basic signal) is transmitted, while the higher harmonics are removed. Without a NAND-unit, the said lower limit to the quality factor is less relevant.

Preferably, the resonant tank circuit of the secondary circuit is configured to have a quality factor in the range of 10-100, preferably 20-80, more preferably 25-50. As a consequence, the bandwidth of the secondary circuit is reduced in comparison with the bandwidth of the primary circuit. More preferably the ratio of quality factors of the resonant circuits of the secondary circuit and the primary circuit is in the range of 3-10, more preferably 4-7.

In a further embodiment, the signal generator comprises a voltage controlled oscillator (VCO). The use of a voltage controlled oscillator has been found to be effective to provide the desired high-frequency signal. In one implementation, the VCO is driven by a pulse with modulated (PWM) signal that is rectified. The PWM signal may originate from a controller, such as a microcontroller chip. The PWM signal can be rectified in known manner. A suitable implementation is the use of a filter, such as a low-pass filter or a high-pass filter and more preferably a third or fifth order pass filter. Implementations of a voltage controlled oscillator are known per se.

A Colpitts oscillator is deemed advantageous, for instance for a resonance frequency around 10 MHz, for instance between 3 and 15 MHz, such as between 5 and 7 MHz. In that range the needed capacitors and inductors can be implemented by means of commercially available components. This colpitts oscillator configuration is preferably implemented with an N-channel JFET provided with a tuning circuit with which the oscillating frequency is set. The tuning circuit is in one implementation an LC tank circuit. This LC tank circuit is made tunable, so as to enable variation of the oscillation frequency, and thus to enable to provide a frequency sweep. One way of rendering the LC tank circuit tunable is that the capacitance is a variable capacitance, such as a varicap. The FET has a common drain configuration, creating low impedance at its output (which is the source). Such low source impedance is beneficial so as to maximize the sensitivity of the sensor circuit.

In again a further embodiment, the signal generator is provided with a switch with which the signal generator can be switched off and on. This is beneficial for energy consumption. The term 'switching off and on' is herein understood to refer also to the situation wherein the repetition rate of the sensing is reduced, i.e. so as to enter a type of 'stand-by' state. The input signal for the switch may be taken from a controller. In one preferred embodiment, the switch is embodied as a NAND gate with a first input coupled to the oscillator and a second input coupled to a port of a controller, wherein an output of the NAND gate is coupled to the send electrode. This configuration allows switching the oscillating signal off and on, and to decrease or increase the repetition rate whenever desired, without impact on the operation of the oscillator as such.

The controller of the present invention is suitably a microcontroller chip that is provided with a circuit for generating a pulse width modulated signal and an analog-to-digital converting circuit, also known as AD converter as well as any output for defining an activity, more particularly an on/off-signal. The microcontroller chip is furthermore provided with a memory for storing reference values and with a processor for comparing reference values with one or more concentration sensing points. Additionally a driver for driving a valve of flushing means may be present. Rather than integrating all these functions into a single chip, it is not excluded that one or more portions thereof are embodied in more discrete manner, i.e. as separate components.

Preferably, the resonant tank circuit of the primary circuit is configured to have a resonance frequency that is less than a centre frequency of the voltage controlled oscillator. More preferably the resonant tank circuit is configured to have a resonance frequency 0.2-0.9 times said centre frequency of the voltage controlled oscillator. Preferably, the resonance frequency lies in the range of 0.4-0.7 times said centre frequency. If the resonance frequency of the resonant tank circuit is smaller than the center frequency of the VCO, the VCO may vary its frequency starting from the center frequency (i.e. lowering) to search for said resonance frequency of the resonant tank circuit.

The resonant tank circuit of the primary circuit receives in accordance with the invention the response from the secondary circuit. This response is to be converted in the output circuit into a output signal. In accordance with a preferred embodiment of the invention, the output signal is an output voltage. The magnitude of the output voltage defines the output signal and can be identified and interpreted in a controller. The output circuit thereto suitably comprises a rectifier and a filter, for instance comprising a capacitor to ground. The capacitor will shunt all higher frequencies to ground and let lower frequencies go. A resistor is suitably added in parallel to prevent the capacitor from charging to a high DC voltage when there is no load attached to it. As a result, the magnitude of the signal can be detected. Preferably, the conditioning of the response into the output signal comprises a capacitive impedance transformation, wherein preferably a voltage ratio upstream and downstream of said impedance transformation is in the range of 1.5 to 10, for instance 2 to 5. Such impedance transformation allows an adequate read out on the basis of the available input voltage. In the context of the present application, the term 'aqueous solution' refers to any aqueous solution present in a sanitary appliance. Typically, the aqueous solution contains charged elements and is an aqueous electrolyte solution. The elements may be ions from inorganic salts, for instance including metal ions, organic charged compounds, such as quaternary ammonium ions, conjugate acid such as acetate, acrylate, sulfonate and so on.

The term 'electrical conductivity of an aqueous solution or variation thereof' is used to indicate that the sensing may be applied to sense a variation of the electrical conductivity rather than an absolute electrical conductivity. The precision of an absolute conductivity sensing may depend both on a calibration as well as any further correction as may be necessary in case that the aqueous solution includes solid, non-dissolved particles. The sensing of the electrical conductivity of the aqueous solution or dispersion is a more precise form of sensing a concentration thereof. The electrical conductivity may be linked to the concentration, if sufficient conversion data are available. Such conversion data include temperature, the type of ions and/or other charged particles in the solution or dispersion. Such data may be known for well defined solutions, such as aqueous salt solutions of sodium chloride (NaCl) and the like, but may be less well known in other cases, for instance when sensing wastewater comprising several salts in unknown ratios. Therefore, it is common practice in the art to determine the electrical conductivity, which is also referred to as a measurement of total dissolved solids.

The term 'chamber and/or tube' is used to express that the method can be applied to any sensible container of fluid, irrespective of its form. Nevertheless, a cylindrical shape is deemed beneficial. The liquid in such a container may undergo a flow—either continuously or intermittently. Alternatively, the liquid may be static.

The sanitary appliance is more preferably a toilet, such as a urinal or a conventional home toilet provided with a means for sitting on the toilet. Alternatively, the sanitary appliance may be a sink or a shower device. In the embodiment that the sanitary appliance is a toilet, the capacitive sensor of the sensor circuit may be arranged for sensing in any tube or chamber of a toilet, including an urinal, and more particularly in a removal tube, for instance specifically in a siphon, in a water chamber bridging a receptacle and the removal tube. The capacitive sensor may also be applied for sensing in the receptacle. In the embodiment that the sanitary appliance is a toilet, the output signal is preferably used by a controller for driving a flushing protocol.

In sensing the conductivity, use can be made of one or more signals, typically defined within a frequency range. The one or more signals may be a series of oscillating signals, such as a frequency sweep. The one or more signals may alternatively be signals at one or more predefined frequencies. Most suitably, in accordance with one embodiment of the invention, use is made of signals with a frequency above 1 MHz. This enables the generation of resonance. A frequency sweep is preferably used for calibration of the sensor circuit at a sensing location. If a calibration of the sensing location is not feasible, as the sensing location is already in use, one may start in a frequency range that is based on earlier sensing on other locations and that have been taken from a memory. Alternatively or additionally, one may carry out a frequency sweep in a first sensing event. A limited number of signals, for instance less than 10, may be used in a sensing event, particularly in case that the concentration or conductivity of the aqueous solution from 0.1-10 times that of a physiological salt solution. At lower concentrations, it is deemed preferable to use a series of signals for a sensing event, more preferably a frequency sweep. When sensing occurs at a sensing location repeatedly, so as to identify variation of the electrical conductivity (which can in such a case typically be linked to the concentration), a required number of signals per sensing event may decrease. Suitably, the said series have an increasing frequency or a decreasing frequency, although—in principle—another series is not excluded. The number of different frequencies and their mutual frequency shift is open to design and implementation.

In order to generate sensing signals in a predefined frequency range, for instance above 1 MHz, it is preferred to carry out a calibration step. Herein the predefined frequency range is determined. The calibration step suitably comprises generating a series of signals within a range around a centre frequency of an oscillator, for instance in the range of 1-50 MHz, preferably 2-10 MHz to determine resonance in the resonant tank circuit of the primary circuit and to determine resonance in the secondary circuit.

In one embodiment of the method of the invention, such series of oscillating signals are provided as a frequency sweep having the centre frequency and a sweep span, for instance with a span width of 0.5-2.0 MHz, such as 0.8-1.5 MHz. The use of a frequency sweep is an effective manner to ensure that the resonating frequency is included. The distance in frequency between subsequent signals is open to implementation. The distance in frequency between consecutive signals is preferably small, for instance in the order of 1 to 50 kHz, preferably 2 to 10 kHz, such as 4-8 or 5-7 kHz. The number of signals is for instance from 20 to 1000, more preferably 50 to 500 and by further preference 100 to 300, such as 200. A single sweep is preferably carried out in a time span of 25 to 250 ms, for instance 50-200 ms, so that more than one frequency sweep per second may be provided, if so desired. The number of frequency sweeps is for instance in the range of 1-10, or 1-5. This number may vary over time, in dependence of activity, as may be programmed in the form of different activity states. It will be understood that the centre frequency and the sweep span are open to optimization and may depend on the exact sensor configuration and the tube or pipe in which measurement is carried out.

It is not excluded that a first and a second sweep are given, wherein the second sweep involves a sweep in a narrower range of interest, said range of interest being identified on the basis of output signal resulting from the first sweep. It is furthermore not excluded that a sweep is repeated several times and that the output signals are summed up, for sake of increasing resolution, if so desired. The oscillating signal is more particularly a signal that is transmitted with an oscillating frequency of 1-100 MHz, more preferably 2-50 MHz, 5-20 MHz, for instance 7-15 MHz or 5-8 MHz. Particularly in the latter range, in the context of preliminary experiments with a specific design, a positive dependence of the signal strength (defined as the voltage amplitude) on the aqueous concentration was observed. It is observed that the optimal frequency range may be at a higher or lower frequency in dependence on tube diameter and/or electrode design. The oscillating signal is preferably generated by means of a voltage controlled oscillator. The input voltage of the controlled oscillator is suitably a DC signal. This DC signal may be generated, for instance by integrating a PWM output from the microcontroller with a low pass filter. Alternatively, it could be obtained from a microcontroller with a digital-to-analog convertor.

Furthermore, the controller may furthermore store sensing data in a memory, for future use as a reference. The sensor circuit may furthermore be coupled to obtain data, either by means of an input or from a database or connected computer, prior to use on the installed configuration.

Additionally, the output signal may be used by the controller for any control operation in a system coupled to the tube or chamber on which the sensing is carried out. For instance, the controller may control a valve or a pump. It is however not excluded that the controller provides an output to a user and/or in the form of a digital sensing report.

In the method of the invention, the output signal is suitably in the form of an output voltage. In case that a series of signals is used, the output voltage is expected to vary for each of those signals. Since in the state of resonance of the primary and secondary circuit the energy absorption is at its maximum, the resulting output voltage will be at a minimum. At this minimum, the impedance is substantially reduced to its real portion thereof, i.e. the resistance. The conductivity can be derived from this resistance. Thereto, use is made, preferably, of an algorithm located in a controller receiving the output signal. Such algorithm for instance comprises the use of a table with references values stored in a memory. Alternatively or additionally, the algorithm may comprise calculation of the conductivity. Thereto, the controller is to be provided with input values on the sensing location. It is observed that the sensor circuit preferably includes the controller. Alternatively, a system controller or another controller remotely located from the sensor circuit could be used thereto. The controller is suitably embodied as a microcontroller integrated circuit. In one embodiment, the method comprises the further step of conditioning said frequency-dependent response into the output signal comprises generating an output voltage varying in function of said response, wherein said conditioning step preferably comprises a capacitive impedance transformation. This is deemed a practical and advantageous way of arriving at a robust output signal. Preferably a voltage ratio upstream and downstream of said impedance transformation is in the range of 1.5 to 10, for instance 2 to 5.

Preferably, the arrangement and configuration of the electrodes are specified in view of the desired type of sensing. Typically, for sensing of an electrical conductivity or variation thereof, the first and second electrodes are arranged such as to be below a water surface in use. In other words, the variation of the capacitance will only be influenced by the conductivity of the aqueous solution.

For sensing variations in the height of the water surface, it is preferred that at least the second electrode is arranged so as that the water surface will divide the second electrode into an underwater area and an air area. In this manner, variations in the location of the water surface can be monitored effectively. The first electrode may be either entirely below the water surface (i.e. a reference state thereof) or partly below the water surface. The first and the second electrode could be at the same height, but it is deemed preferable that the first electrode is at a lower level that the second electrode, so as to be for a larger portion below the water surface. The latter is particularly preferred when the sensor is intended for sensing transient variations in the height of the water surface, more particularly the location of the water surface at a tube wall.

One application of sensing transient variations is to distinguish between inflow of solid matter and inflow of liquid matter. If solid matter falls into the water, the water surface will temporarily and locally increase, and typically thereafter locally decrease at the same location. The increase leads to an overall increase in the dielectric constant of the medium between the first and second electrode. In itself, such increase may only be minor. However, by means of the sensor circuit having a primary and a secondary circuit, this minor increase is amplified to a robust output signal on the basis of the resonance amplification.

This application is for instance deemed highly advantageous for use in sanitary appliances. Thus, the sensor circuit of the invention can then be used as a method of electronically distinguishing inflow of solid matter from inflow of liquid matter in the sanitary appliance, and especially a toilet. The resulting output signal may be used by a controller for control of a cleaning operation of the sanitary appliance. Such cleaning operation is for instance flushing with water. Thus, the flushing volume may be set automatically in dependence the inflow of either solid or liquid matter. Clearly the cleaning operation may further comprise a more elaborate cleaning protocol. For instance, the protocol may prescribe that soap may be added and/or perfume may be added after detection of inflow of solid matter. Additionally, the protocol may specify that upon inflow of solid matter a delay in time for starting flushing is increased relatively to such delay in time upon inflow of liquid matter.

Therefore, in a further aspect, the invention relates to the method for sensing in a sanitary appliance, such as a toilet as to inflow of either solid matter or liquid matter, using the sensor circuit as hereinabove defined.

In again a further aspect, the invention relates to a method for sensing in a sanitary appliance of an obstruction in a removal pipe of the appliance, using the sensor circuit as hereinabove defined. The higher level of the water surface in the second state may then be permanent or semi-permanent (i.e. slowly or gradually being removed, as opposed to temporary in the sense of transient).

More particularly, the sanitary appliance referred to is provided with a controller that is configured to compare a sensed variation of the location of the water surface in time with reference values stored in a memory. Preferably, the controller is further configured to control performance of any action protocol in dependence of the detected variation of the location of the water surface.

Preferably, the first electrode is arranged such that at least a primary portion thereof is below the water surface regardless of any variation of the location of the water surface. In combination herewith, the second electrode is arranged at the tube wall and configured such that a first part of the electrode is above the water surface and a second part thereof is below the water surface, wherein said first part and said second part vary with a variation of said location of the water surface at the tube wall.

For sake of clarity, reference is made to a reference state of the water surface, as the water surface may vary. This reference state particularly refers to a state wherein no inflow or outflow of water or any aqueous solution or anything else occurs. Typically, in a toilet, this is a state wherein the toilet is installed, but no person uses the toilet. As to the term 'location of the water surface', it is observed that during inflow of solid matter the water surface will deform for a substantially flat surface to a curved surface. At a side of the tube, this tends to have the effect of an increase and a subsequent decrease in the height of the water surface.

The second electrode is in the reference state (or first state) at least partially above the water surface. Suitably, at least 50% of the second electrode is above the water surface. Preferably, the extension of the water surface is at least 70%, such as at least 80%. At least 90% or even 100% are furthermore feasible. Notwithstanding, it seems beneficial that the second electrode is below the water surface for a predefined portion, when the water level has its reference level, for instance so as to enable the sensing of decreases in the water level as well.

The second electrode is furthermore configured such that upon increase of the height of the water surface, a larger portion of the second electrode is below the water surface than in the reference state. For instance, at least 30%, preferably 50% of the second electrode may extend below the water surface, such as 70%, 80% or even more. Clearly, if only 10% of the second electrode is below the water surface in the first state, than an increase to 20 or 25% below the water surface can be sensed adequately. The percentages given here are intended to be percentages of the area of the second electrode. The sensitivity of certain water levels may be increased in that the second electrode has a shape different from a rectangular bar extending in the vertical direction.

Thus, preferably, the extension of the second electrode is both above the water surface and below the water surface. More preferably said extensions above and below the surface are sufficient to accommodate the inflow of solid matter and to accommodate any variation in the level of the water surface in the first state. In one implementation, the extension of the second electrode in the vertical direction is at least 6 cm, preferably at least 10 cm, or even at least 15 cm.

The second electrode is preferably arranged so as to extend in a direction perpendicular to the water surface, i.e. typically the vertical direction. However, the second electrode may include horizontal portions located at different height levels. As the capacitance is directly linked to the surface area, this enables that the capacitance will increase rather stepwise upon an increase of the water surface. Such contributes to an effective sensing. It is not excluded that another electrode pattern is applied, with a vertical extension and also with horizontal extensions.

In an alternative implementation, the second electrode comprises several strips (horizontal portions) which are not directly connected by any vertical portion but arranged in parallel—that is in the circuit, and thus all connected within the secondary circuit. This implementation results in a sensor that identifies the height of the water surface in entirely discrete steps. Although this implementation may give less precise results, the controller may well be configured to compare such result with reference results and identify whether—and possibly how much—inflow of solid matter occurs.

In a further embodiment, the sensor circuit may further comprise a third electrode, which is located with respect to the water surface in a corresponding way as the second electrode; thus practically at least partly above the water surface in the first, reference state and partly below the water surface in the second state. However, such third electrode located at another position of the tube wall. The third electrode could be arranged rather at the opposed side (i.e.

such that the second and third electrodes include an angle in a plane in the water surface of between 135 and 225 degrees, such as between 160 and 200 degrees). The third electrode could also be arranged such that the second electrode and the third electrode include an angle of between 60 and 120 degrees, such as between 80 and 100 degrees. The included angle could even be smaller, for instance up to 45 degrees.

In one embodiment, the second and third electrodes are arranged in parallel. Preferably, both electrodes have each separate first electrode, although a common first electrode is not excluded. In one embodiment including a primary and a secondary circuit, they would be part of the same secondary circuit. This has the advantage that the contributions of the sensing by means of the second and the third electrode add up, providing a larger signal-to-noise ratio. This embodiment appears preferable for the case that the angle between the second and third electrode is small (for instance up to 120 degrees, and more particularly up to 60 degrees).

In another embodiment, the second and third electrode are arranged to be part of separate capacitive sensors that can be sensed independently. In the preferred implementation hereof, the third electrode may be part of a separate secondary circuit. This has the advantage that the different locations may be sensed independently. This can provide additional information, as an increase of the water surface on one side of the wall may correspond to a variation at the other side, but not entirely on the same moment. The extra information can be used to reduce the error margin in the controller.

It is observed for clarity that the capacitive sensor configured for sensing a variation in the location (typically height) of the water surface may be used to identify solids falling into the water, or to identify an obstruction in the removal pipe. It is foreseen that one capacitive sensor can be configured to sense both ingression of solid matter and presence of an obstruction. Nevertheless, it could alternatively be that the capacitive sensor is configured for specifically one of both uses. The desired use may further have an impact on the exact shape of the second electrode, and optionally on the shape and location of the first electrode.

In one embodiment, the first electrode may be present at a bottom side of the tube. This is deemed beneficial, as it provides a good coverage of field lines. In another embodiment, the first electrode may be present at a side wall of the tube. This could be the same or a different side wall as the second electrode. In the latter case, it is not excluded that the first electrode is not entirely but just substantially below the water surface in the first state. Substantially could for instance be at least 80%.

It is observed for sake of clarity and completeness that a single sanitary appliance may be provided with a 'water level sensor' and a 'conductivity sensor', with which inflow of urine and its strength may be identified. More preferably, the conductivity sensor will be arranged at a surface of a siphon, whereas the water level sensor is located more upstream, i.e. at the water surface. Beyond the above mentioned conductivity sensor, use can be made of a sensor described in the non-prepublished application PCT/EP2017/079802, that is included herein by reference. The conductivity sensor may alternatively be arranged at an area of the receptacle. Such as sensor is known per se from WO2014/076284A1 that is included herein by reference. The addition of a conductivity sensor enables to detect inflow of liquid matter. It is not excluded that the same sensor is used for detecting of inflow of liquid matter and of solid matter.

It is observed that any of the embodiments discussed in the foregoing and hereinafter are applicable to all and any of the aspects of the inventions as specified hereinabove and/or in the claims. Particularly, embodiments relating to the method or the use also apply the sanitary appliance and vice versa.

BRIEF INTRODUCTION OF THE FIGURES

These and other aspects of the invention will be further elucidated with reference to the figures, wherein.

Figure 2:
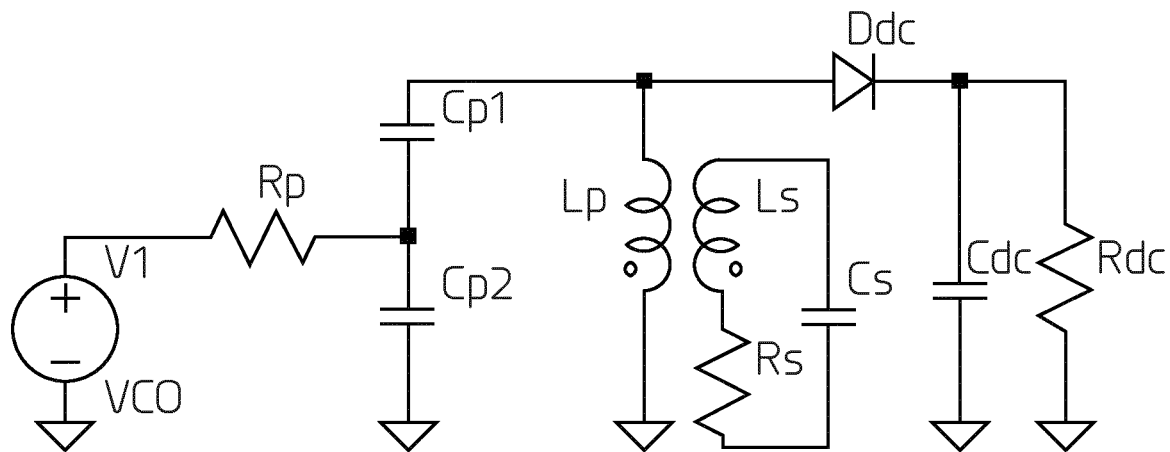
FIG. 2 shows an electric diagram of the sensor circuit including the primary and secondary circuit.
Figure 5:
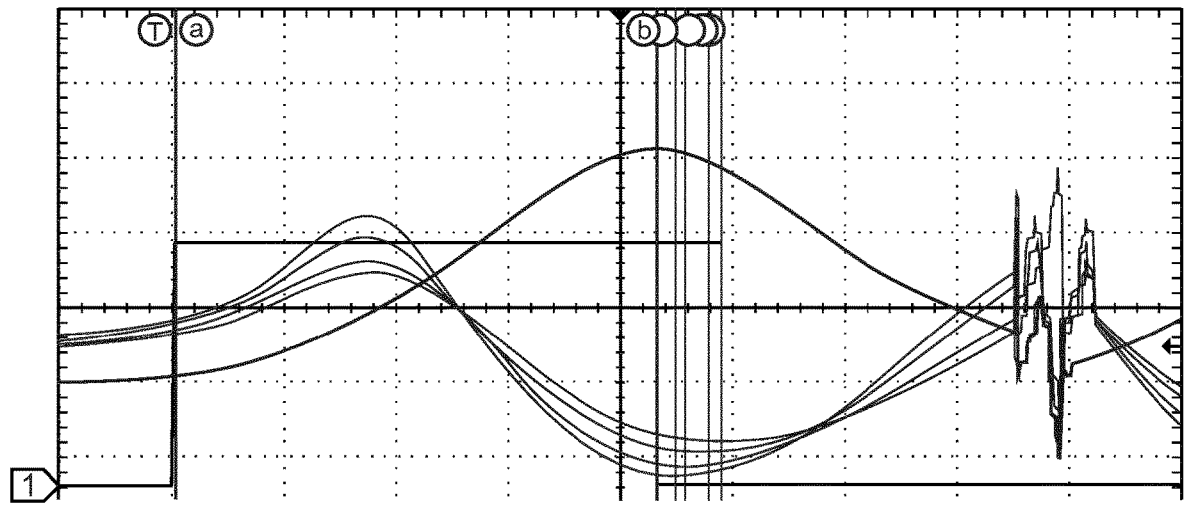
Figure 6A:
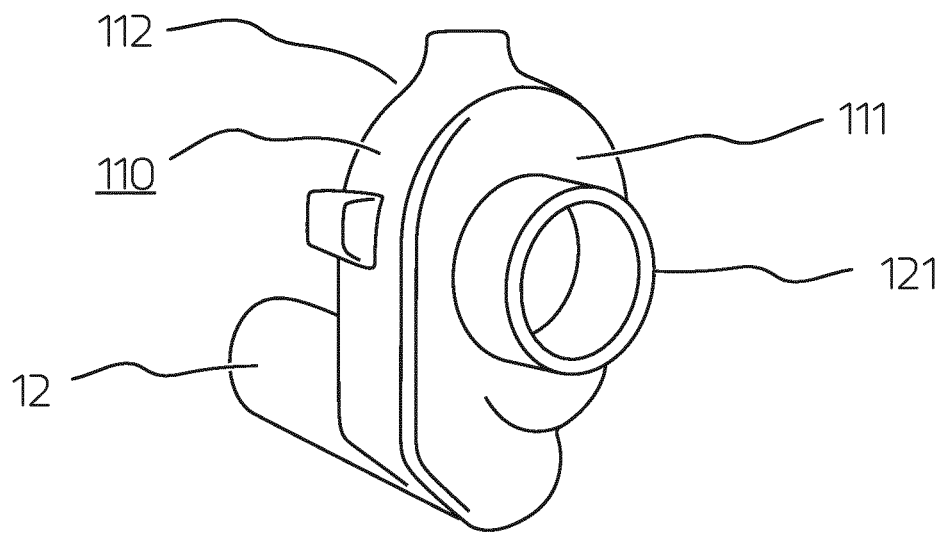
Figure 6B:
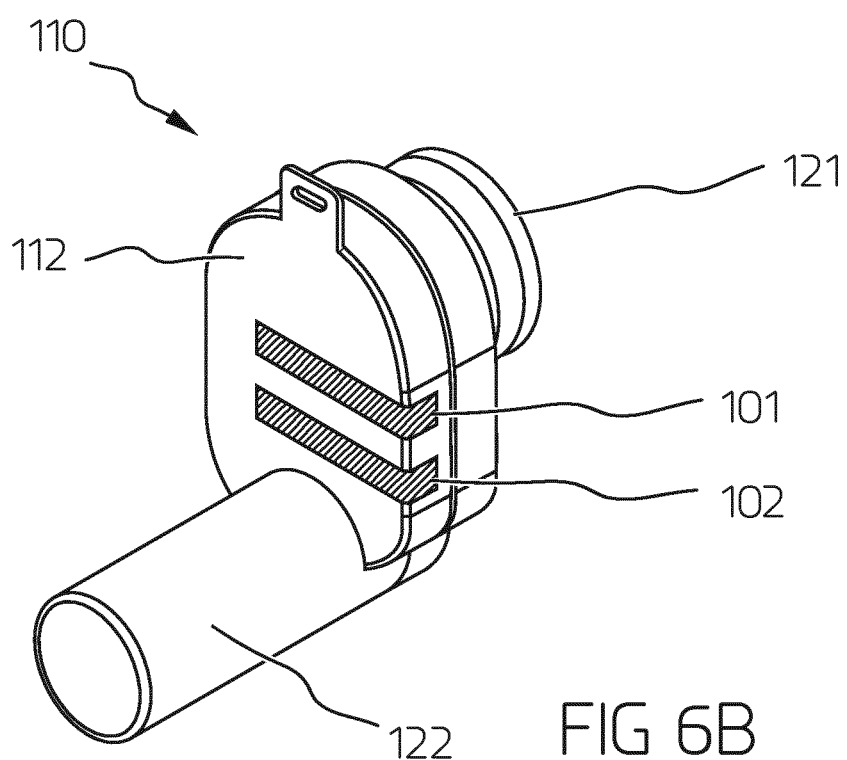
Figure 6C:
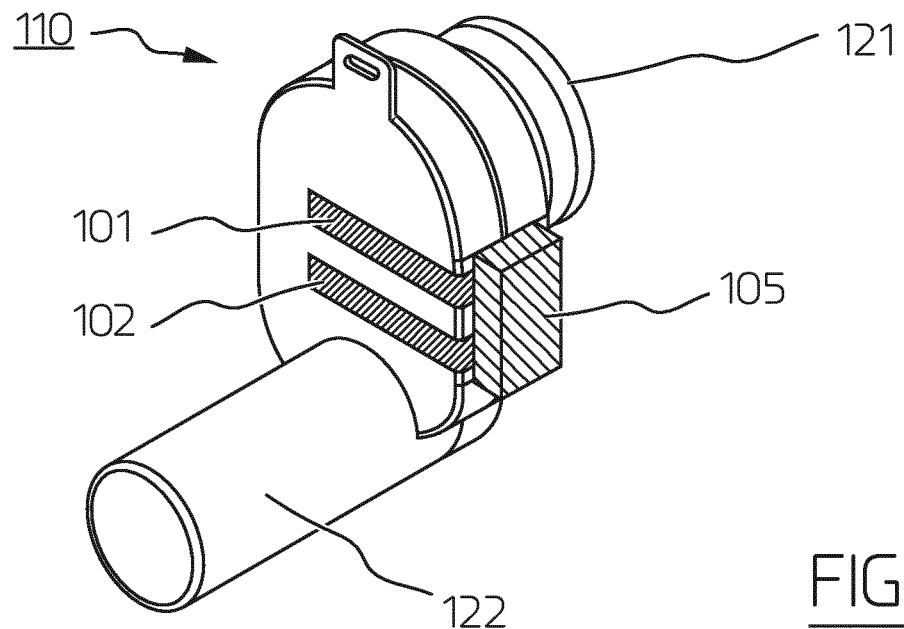
Figure 8:
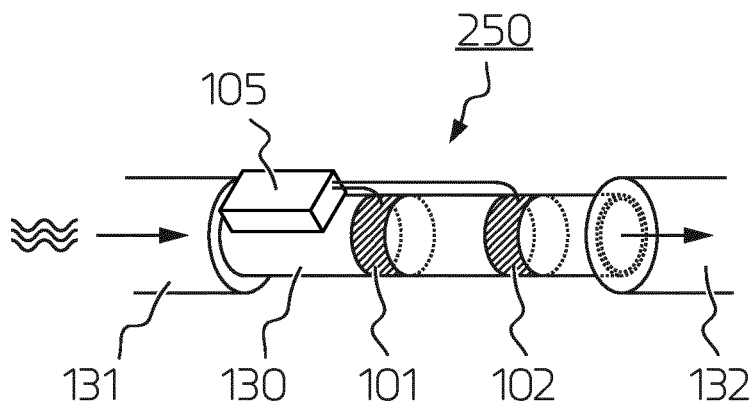
Figure 9:
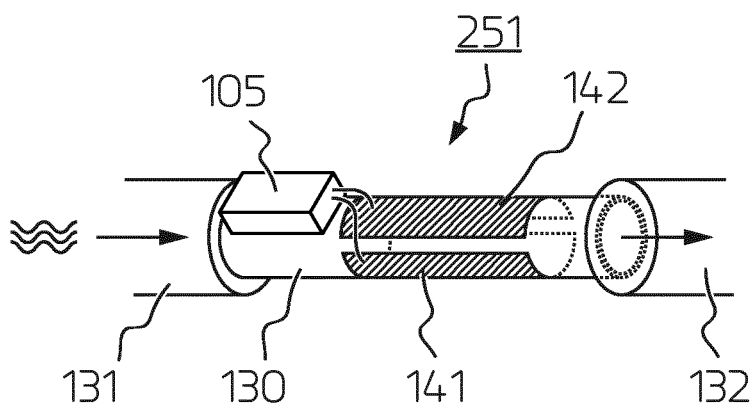
Figure 10:
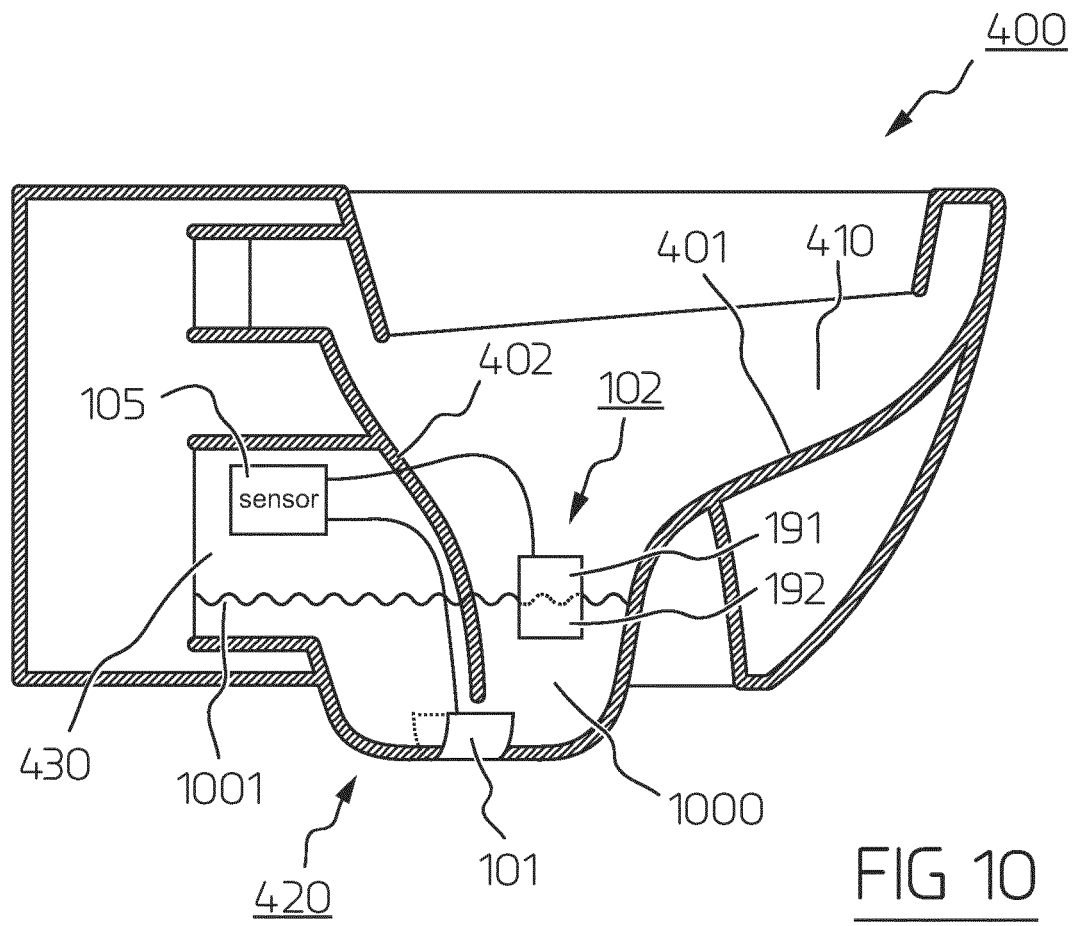
Figure 7:
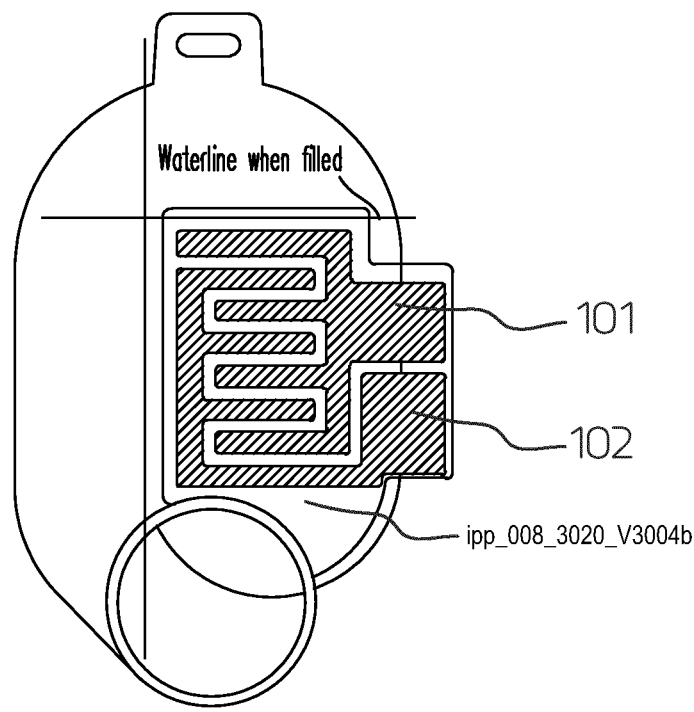
Figure 14:
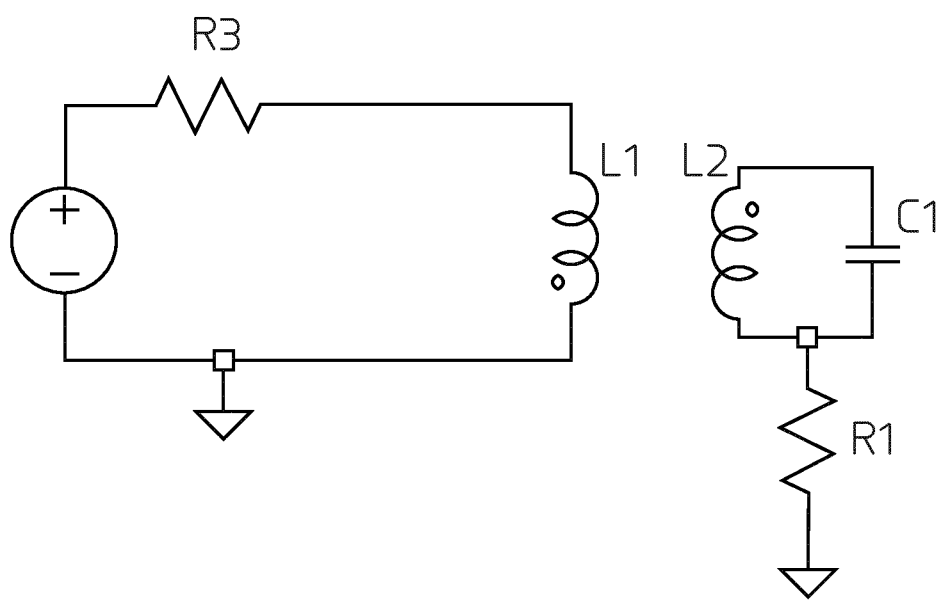

FIG. 4a, FIG. 4b, FIG. 4c, FIG. 4d, FIG. 4e, FIG. 4f, FIG. 4g, FIG. 4h, and FIG. 4i show responses of several aqueous electrolyte solutions and air on a test tube;

FIG. 5 shows responses of several aqueous electrolyte solutions and air on a test siphon;

FIG. 6A and FIG. 6B show in bird's eye perspective a first embodiment of a system comprising the electrodes of the capacitive sensor of the invention, said system being embodied as a siphon;

FIG. 6C shows in bird's eye perspective a further implementation of FIG. 6B;

FIG. 7 shows the siphon as shown in FIG. 6A, FIG. 6B, and FIG. 6C with an alternative arrangement of the electrodes;

FIG. 8 and FIG. 9 show in bird's eye perspective a third and a fourth embodiment of a system according to the invention;

FIG. 10 shows a diagrammatical cross-sectional view of a fifth embodiment of a system according to the invention, the system being a sanitary appliance, more particularly a toilet;

FIG. 11 shows responses of air, tap water and salt water on a test siphon having the arrangement of electrodes shown in FIG. 7;

FIG. 12(a) and FIG. 12(b) diagrammatically show the use of the sensor of the invention for determining a level of liquid;

FIG. 13(a), FIG. 13(b), FIG. 13(c), and FIG. 13(d) shows a series of graphs on simulations and measurements using the circuit of the invention as specified in FIG. 2;

FIG. 14 shows an electric diagram of a prior art sensor circuit having a floating secondary circuit; and FIG. 15(a), FIG. 15(b), FIG. 15(c) and FIG. 15d shows a series of graphs based on simulations with the circuit according to FIG. 14 and using different conditions.

DETAILED DESCRIPTION OF ILLUSTRATED EMBODIMENTS

The figures are not drawn to scale. Equal reference numerals in different figures refer to equal or corresponding elements.

Figure 1:
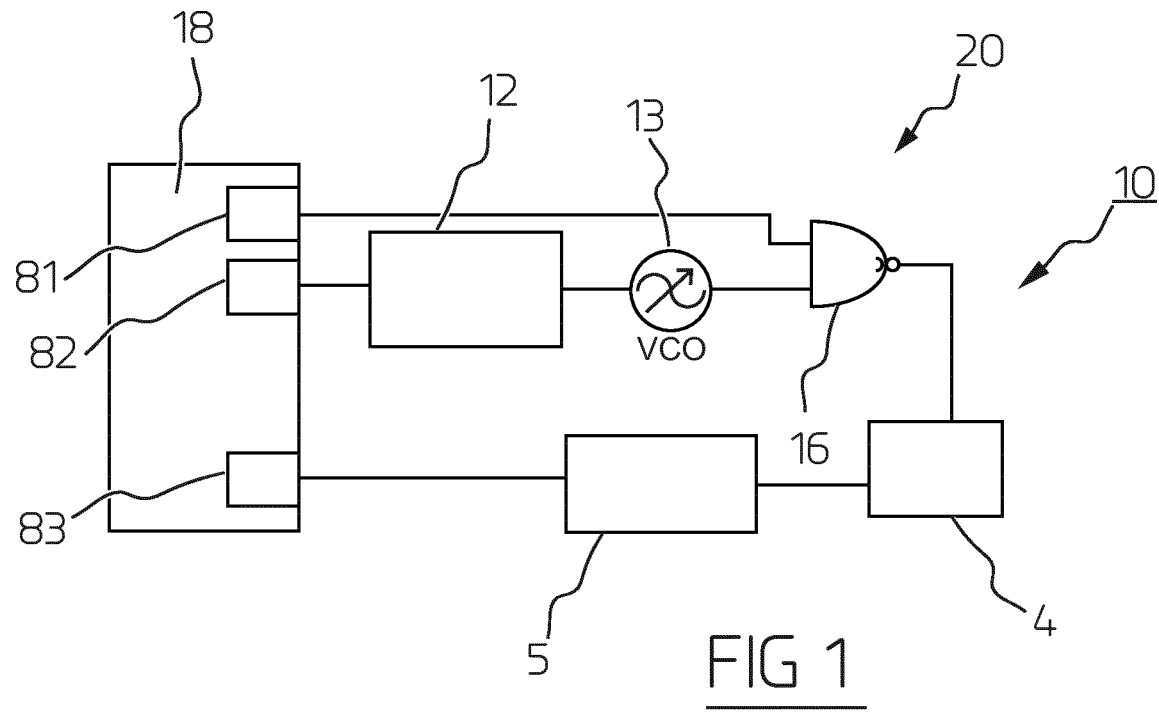
FIG. 1 shows a schematic representation of sensor circuit, including a microcontroller chip.

FIG. 1 shows a schematic diagram with a sensor circuit 10 according to the invention in combination with a microcontroller 18, for use as part of a sanitary appliance. The microcontroller 18 is herein embodied as an integrated circuit, embodying a plurality of signal blocks, including a pulse width modulated signal (PWM) generator 82, an A/D-converter 83, a RF on/off output 81, a processor and a memory. Such microcontrollers are commercially available from integrated circuit suppliers such as NXP, Atmel, Analog Devices, Texas Instruments. Notwithstanding this preferred implementation, it is not excluded that some of the signal blocks in the microcontroller may be embodied as separate integrated circuits or even in discrete forms, or by means of combinations thereof. Furthermore, while some functions are herein shown to be provided in the form of discrete components, it is not excluded that these are integrated into one or more integrated circuits or other integrated components, such as a passive network on a silicon substrate ("passive IC"), a component on the basis of a ceramic substrate, for instance aluminium oxide or a multilayer device known in the art as LTCC (low-temperature co-fired ceramic), or on the basis of a polymer substrate, such as a PCB with embedded components. It is not excluded either, that some of the functions are integrated into the microcontroller or into a dedicated integrated circuit, or into a multichip solution that may be provided in a single package, for instance a passive IC in addition to the microcontroller chip. For sake of clarity, it is observed that logically, the system is subdivided into a sensor circuit and a controller. Technology-wise, the microcontroller may be considered as containing blocks that stricto senso belong to the sensor circuit. For sake of simplicity, reference is made herein to the sensor circuit 10 and the microcontroller 18.

The sensor circuit 10 comprises a signal generator 20, a sensing unit 4 and an output circuit 5. The signal generator 20 comprises a plurality of elements being an integration circuit 12, more particularly a low-pass filter and a voltage controlled oscillator 13 and a NAND-block 16. The integration circuit 12 is connected between the PWM generator 82 and the voltage controlled oscillator (VCO) 13. The output signal of the VCO 13 forms one input of the NAND-block 16. It provides a signal at a desired oscillating frequency, which frequency is set in dependence of the signal coming from the PWM generator 82. The other input is taken from an on/off signal output 81 from the microcontroller 18. This signal determines whether an output signal is transmitted to the sensor unit 4, and also how long. If desired, the NAND block 16 can be left out.

In view of its use in sanitary environment, where water leakage cannot be excluded, the sensor circuit is suitably provided with a package that forms an enclosure through which moisture cannot enter the sensor circuits and/or any of its components. Such an enclosure may be achieved, for instance, by means of a housing with a lid, that is sealed at its outside. Alternatively, the circuit or relevant portions thereof may be encapsulated with a moulding compound. In one embodiment, the sensor circuit may be provided with a substrate into which the first and the second electrode are integrated. These electrodes are thus arranged on an outside of the sensor circuit and can be positioned adjacent a tube wall, while the sensor circuit nevertheless constitute a unity. Furthermore, it is deemed advantageous, when the sensor circuit is provided with any means for wireless or wired connection, including a wireless transmission module (for instance on the basis of Zigbee-protocol or the like), a USB-connector or any other means for wired and/or wireless transmission as known per se.

In one embodiment the sensor circuit including the primary and the secondary circuit and the microcontroller are arranged on a substrate such as a PCB, which is configured for attachment to the siphon of the sanitary appliance. The attachment is suitably arranged such that the sensor circuit does not get into contact with any liquid within the tube. It is for instance attached at an outside of the tube wall. Alternatively, it may be arranged in a slot designed for placement of the sensor circuit.

In another embodiment, the first and the second electrode 101, 102 (as shown in further figures) are located on the tube wall, whereas the remaining part of the sensor circuit is arranged away from the liquid inside the tube. The first and second electrodes 101, 102 could be arranged, in this embodiment, both an inner side of the tube (when protected with a suitable protective coating), and at an outer side of the tube, facing away from the liquid within the tube. The electrodes 101, 102 may for instance be applied on a flexible foil that is attached to the tube wall. It is furthermore feasible that the first and second electrodes 101, 102 are integrated into the tube wall, i.e. the wall of the siphon.

In the embodiment wherein the capacitor electrodes 101, 102 are physically separated from the remainder of the sensor circuit, it is deemed beneficial that the distance between the said capacitor electrodes 101 and 102 and the remainder of the circuit is limited, for instance in the order of centimetres. Long distances may increase noise and thus reduce sensitivity. In such an embodiment, the remainder of the circuit is suitably encapsulated by means of any moulding compound or provided in a housing that is sufficiently resistant against humidity.

FIG. 2 shows an electric diagram of the sensor circuit according to a first embodiment of the invention. In this Figure, no NAND block 16 is indicated. Starting from the VCO 13, the circuit comprises a primary resonant tank circuit 50. In this embodiment, the resonant tank circuit 50 comprises a first and a second capacitor Cp1, Cp2 and an inductor Lp. A resistor Lp is indicated. This can be either a resistor or may be due to resistive losses. The resonance frequency of the resonant tank circuit 50 is tuned relative to the centre frequency of the VCO 13. Preferably, the resonance frequency is in the range of 0.3-1.0 times the centre frequency of the VCO 13. The second capacitor Cp2 is herein coupled to ground. The first capacitor Cp1 is coupled in series with the inductor Lp, which is coupled to ground. This resonant tank circuit 50 of the primary circuit has a quality factor in the range of 20-50, suitably between 30 and 40. In order to correct for output impedances in the VCO and/or other parts of the primary circuit, the quality factor of the resonant tank circuit 50 is preferably about half of the Q-factor of the inductor.

The primary circuit is coupled via the inductor Lp to the secondary circuit. In this embodiment, the secondary circuit is a resonant tank 60 and comprises an inductor Ls and a capacitor Cs, that jointly constitute a cycle. A resistance Rs is included which represents the resistance of the fluid, of which the concentration is to be measured. If there is no fluid, the resistance Rs will be very high. If the fluid is a concentrated salt solution, the resistance Rs is small. In case Rs is small, the secondary circuit will absorb the energy from the primary circuit at resonance. As a consequence, the response is highly dependent on the concentration of the fluid.

As shown in FIG. 1, the signal generator 20 comprises a NAND gate 16 with a first input originating from an on/off port 81 of the microcontroller 18 and a second input originating from a voltage controlled oscillator 13. This oscillator 13 is fed by a pulse width modulated signal from the microcontroller 18 after integration in an integration unit 122. The integration unit 2 is preferably embodied as a passive low-pass filter. More preferably, a higher order low-pass filter is used, such as a third, fourth or fifth order low-pass filter. However, it is not excluded that another low-pass filter or a DAC output of a microcontroller is used. The advantage of the higher order low-pass filter is a dc signal with reduced ripple to improve frequency jitter of the VCO. Most preferred is a third order low-pass filter, since the response time thereof is shorter than that of the fourth or fifth order filter.

Figure 3:
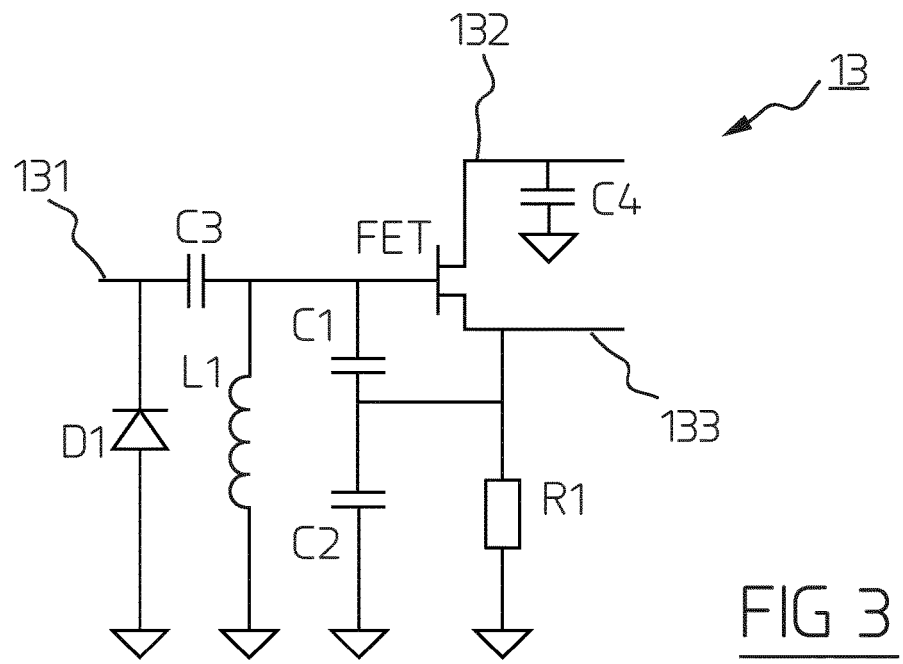
FIG. 3 shows a first embodiment of the voltage controlled oscillator.

FIG. 3 shows a preferred implementation of the voltage controlled oscillator 13. It is a Colpitts oscillator. Such an oscillator comprises a transistor, more specifically a field effect transistor FET, and a tank circuit of an inductance L1 and capacitances C1 and C2 in parallel. The transistor FET is provided with a gate coupled to an input signal 131 that originates in the preferred embodiment from the low-pass filter 12 (see FIG. 1). The transistor FET is further provided with a drain carrying a signal 132, and with a source carrying the output signal 133. The tank circuit is coupled between the gate of the FET and ground. Furthermore, a connection is made between the source of the FET and the point in the tank circuit between C1 and C2. The source is further coupled to ground over a resistor R1, in addition to providing an output signal 133. In this manner, a return path is created from the transistor source to the gate. The circuit will oscillate with an oscillation frequency that is set by means of the capacitances C1, C2 in the tank circuit. In a suitable embodiment, a variable capacitor, herein shown as a diode D1, is added parallel to the tank circuit, so that the frequency can be tuned after assembly into the desired application. As a consequence: the higher the voltage, the higher the capacitance.

FIG. 4a to FIG. 4i show a series of sensing results obtained in accordance of the invention. Use was made of a test set up with an external plastic pipe and test tubes that were inserted into the plastic pipe. The plastic pipe was made of PVC and had an internal diameter of 16 mm. Ring-shaped electrodes were present on the outside of the plastic pipe. The test tubes had a corresponding outer diameter so as to fit into the plastic pipe. The electrodes were coupled to a printed circuit board that included a microcontroller chip, a voltage controller oscillator, a NAND block and an output circuit in accordance with FIG. 1. The sensor circuit was set up in accordance with FIG. 2. The first inductor Lp was 22 µH and the secondary inductor was 68 µH. The capacitors Cp1, Cp2, Cdc were all chosen in the range of 100-200 pF. The inductors were embodied as SMD-components. The assembly was arranged so as to achieve a coupling factor in the range of 0.15-0.17. The resonance frequency was about 6 MHz. For the sensing, a sweep was given with a width of about 1.2 MHz, from low to high frequency. Immediately thereafter, a second series of signals was sent through the circuit. The signals in this second series corresponded to the same sweep, but the step size was 20 times as high. The output signal was shown on an oscilloscope.

Figure 4A:
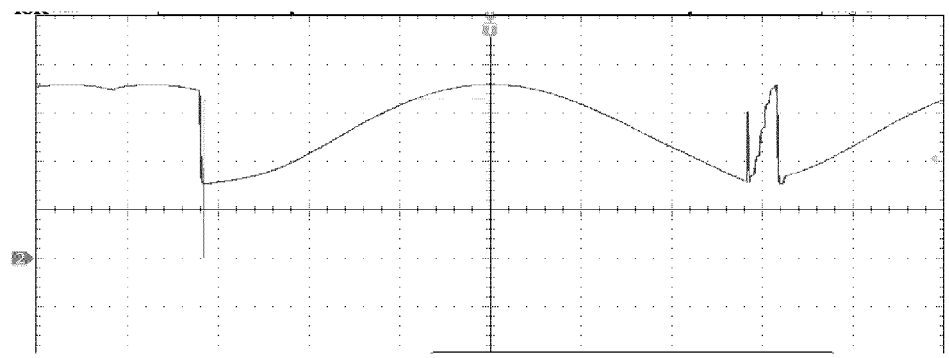
Figure 4B:
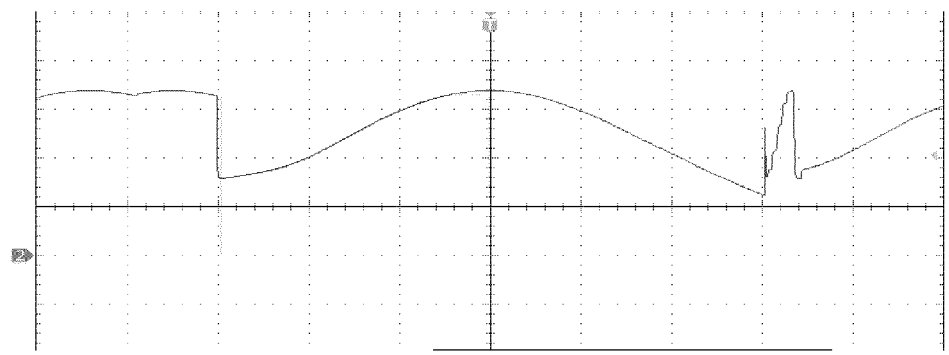
Figure 4C:
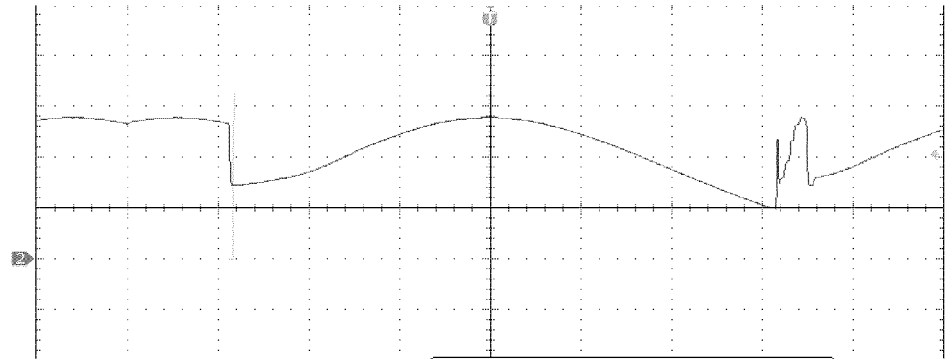
Figure 4D:
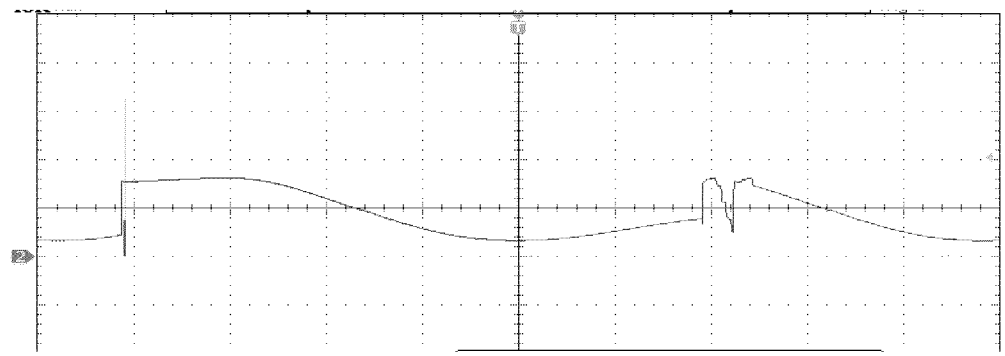
Figure 4E:
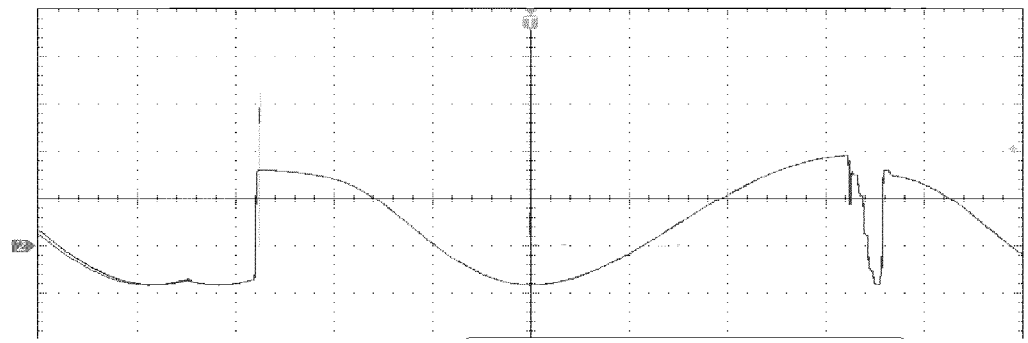
Figure 4F:
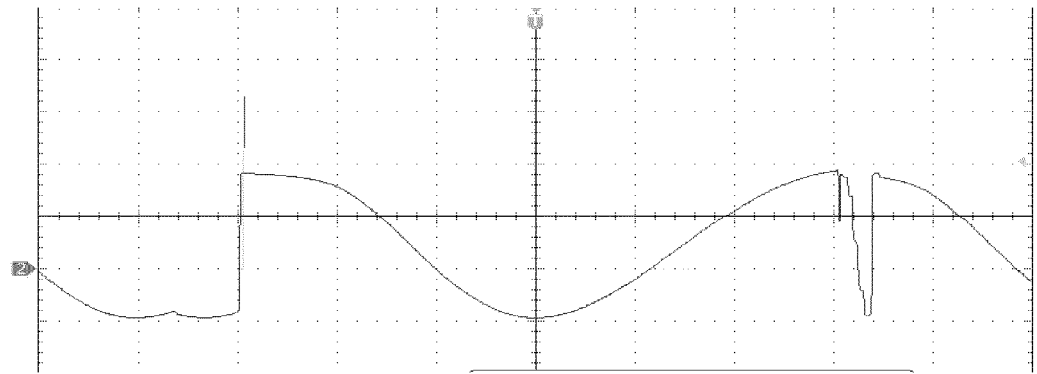
Figure 4G:
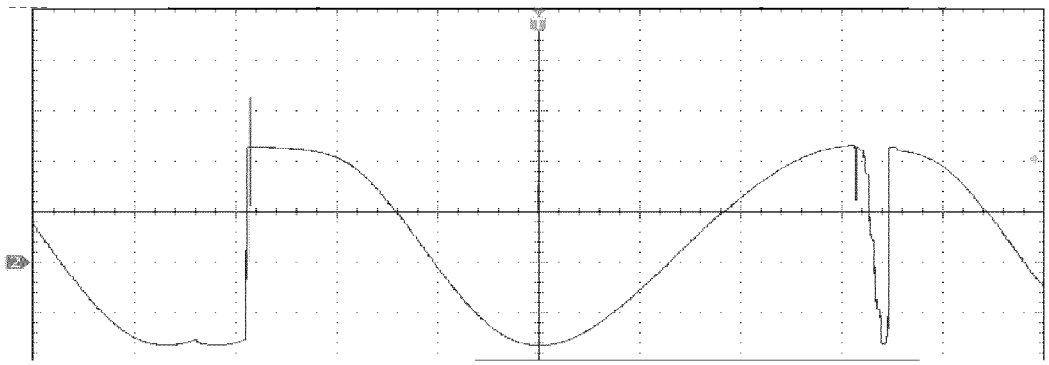
Figure 4H:
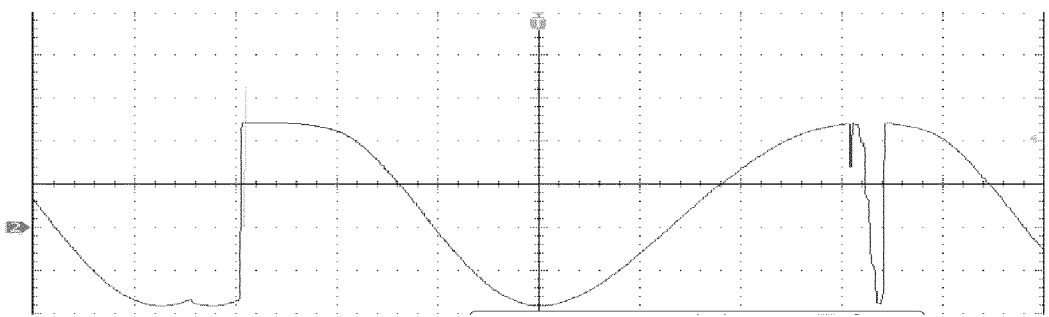
Figure 4I:
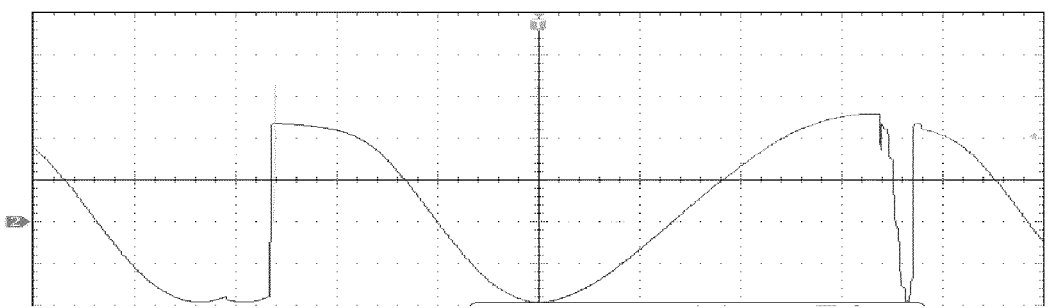

In each of the FIGS. 4a to 4i, a graph is shown of the output voltage as a function of time (which corresponds to the frequency). The medium used in the experiment of FIG. 4a was air. For FIG. 4b, demineralized water was used. For FIG. 4c, tap water from the tap in Antwerp, Flanders was used. For FIG. 4d, light urine was used. For FIG. 4e, a physiological salt solution was used. For FIG. 4f heavy, or dense urine was used. FIG. 4g shows the result for sea water. FIG. 4h shows the result for a 25% saturated salt solution. FIG. 4i shows the result for a completely saturated solution. The frequency sweep was started where a background square-wave type line (indicated in grey) goes from low to high.

It is apparent from the figures that the maximum amplitude of the graph goes from high to low. A slight change in the resonance frequency was observed. The situation shown in FIG. 4a, with air as a medium corresponds to the situation wherein there is only resonance in the primary circuit. The secondary circuit is not closed, and hence no current may run through the secondary circuit. With increasing concentration of the aqueous electrolyte solution, the maximum changes into a minimum. This indicates that more and more energy is absorbed into the secondary circuit, with the effect of resonance in both the primary and the secondary circuit. The situation in FIG. 4i for a saturated salt solution corresponds to the situation, wherein all energy is absorbed into the secondary circuit. This experiment demonstrates that a change in conductivity can be measured from very low to very high, i.e. in a wide range of concentrations/conductivities.

FIG. 5 shows the sensing results of a second experiment. In this second experiment, use was made of a siphon test tube that is depicted in FIGS. 6A and 6B. The siphon contains an inlet connection 121 and an outlet tube 122. In between thereof a house 110 is present, having a front side 111 and a rear side 112. As a consequence of the form of the house, water passing through the siphon will make a movement through the house in a counter-clockwise direction. The siphon test tube is made of plastic, particularly PVC. Sensor electrodes 101, 102 were attached to the rear side 112. Copper strips were used as electrodes. The strips had a length of 7.8 cm and a width of 1.8 cm. The mutual distance between the strips was 0.3 cm. The electrodes were connected with a wire to the inductor on the printed circuit board. The same printed circuit of the earlier experiments was used. The sensing was carried in the same manner as discussed above, with a sweep and subsequently the same sweep with 20-fold increased step size. This second experiment was carried out in this manner, as it is considered as a less ideal sensing situation than a test tube, and hence more representative of conductivity sensing in practice.

In FIG. 5, the results of the various solutions are shown on top of each other in one graph. With an increase in concentration of the solution, the initially positive peak signal on the resonance frequency was converted into a negative peak signal (a dip) in the output voltage. In this experiment, it turned out that the turning point between a positive and a negative peak occurred at a lower concentration (i.e. conductivity). This shows the sensitivity at low concentrations. Furthermore, a positive peak is visible for all graphs except 1 (corresponding to air) at a lower frequency. This peak is due to the resonance in the primary circuit, prior to the occurrence of resonance in the secondary circuit. It is thus no surprise that in the graph for air, in which the secondary circuit does not contribute, this peak is not visible. The peak may be seen as the effect of generating a flattened resonance curve in the primary circuit, due to a relatively low quality factor in the primary circuit.

Table 1 provides the change in resonance frequency for the sensing results shown in FIG. 5. The indicated result is based on 150-175 counts per entry, so as to have sufficient statistics.

| Type of medium | Added volume of physiological salt solution | Resonance frequency (MHz) |
|---|---|---|
| Air | | 5.763 |
| Tap water | 0 ml | 5.857 |
| Tap water | 25 ml | 5.838 |
| Tap water | 50 ml | 5.804 |
| Tap water | 75 ml | 5.796 |
| Tap water | 100 ml | 5.793 |
| Tap water | 150 ml | 5.793 |

-continued

| Type of medium | Added volume of physiological salt solution | Resonance frequency (MHz) |
|---|---|---|
| Tap water | 200 ml | 5.793 |
| Saturated salt solution | | 5.793 |

FIGS. 6C, 8 and 9 show further embodiments of the system of the invention comprising a tube or a chamber and a sensor circuit. In each of these embodiments, the sensor circuit comprises a capacitive sensor with a first electrode 101, 141 and a second electrode 102, 142. The aqueous solution constitutes the medium of the capacitive sensor. FIG. 7 shows an alternative electrode configuration.

As shown in FIG. 6C, the sensor circuit is—beyond the sensor itself—embodied in a box 105, located at an outside of the chamber or tube. The first and second electrodes 101, 141; 102, 142 may be configured so as to extent into the box 105, or to be connected thereto by means of an interconnect. The box 105 preferably comprises the signal processor and the output circuit of the sensor circuit. The box 105 furthermore comprises the contactless transmission of the primary to the secondary circuit, preferably embodied by means of a first and a second inductor. The implementation of the elements of the sensor circuit into the box 105 is open to design. Use can be made of standard discrete components assembled on a printed circuit. Alternatively, use can be made of integrated components, such as inductors and capacitors arranged in a printed circuit board, a ceramic substrate and/or an integrated circuit based on a silicon substrate. Integration of components into substrate and/or such an integrated circuit is deemed advantage, so as that the overall number of components can be reduced. The box 105 may then comprise one or a set of encapsulated components. Such a situation is deemed preferable, in order to reduce the risk of failure due to inflow of humidity or contamination. Furthermore, the box 105 may be provided with any means for data exchange of the sensor circuit with an external medium. Such a means for data exchange may be embodied as a connector, for instance a USB-connector. Alternatively or additionally, such a means for data exchange may be embodied by means of a wireless transmission module. Such a wireless transmission module is known as such and typically comprises an transceiver, optionally a power amplifier and an antenna, all configured for a predefined transmission frequency and data protocol. Furthermore, the box 105 suitably contains a medium for energy storage, such as a battery. In this manner, the sensor circuit is not merely feasible for use at an incidental sensing operation, but also for continuous monitoring over a predefined period, with a predefined frequency, or alternatively upon provision of a signal to the sensor circuit.

The first and second electrodes 101, 141, 102, 142 may be implemented and mutually arranged in a manner so as to provide an overall capacitance that brings the sensor circuit from a first state without resonance to a second state with resonance. This depends on the configuration of the chamber or tube, and particularly on the expected conductivity of the aqueous solution: if the sensor is to be sensitive in the range of 1-10 mM, the surface area of the electrodes as well as the mutual distance will be smaller than if the sensor is to be sensitive in the range of 1-10 M.

FIG. 7 shows the siphon of FIGS. 6A, 6B and 6C in a diagrammatical front-view, however with a different arrangement of the first and the second electrodes 101, 102.

The electrodes 101, 102 are herein shown in white, and the remaining parts in black. In the shown configuration, the electrodes are arranged as a pair of interdigitated fingers, the fingers of each electrode being interlocked. This arrangement of the first and the second electrodes 101, 102 results in an increased capacitive coupling.

The effectiveness of electrode configuration for the conductivity sensing of salt water, as opposed to either air or tap water, was demonstrated in a small experiment with the siphon. The results are shown in FIG. 11. The y-axis displaces the conductivity (relative to the initial value). The x-axis shows the resonance frequency in MHz. The dotted line represents the sensing of air, the dash-dotted line the sensing of tap water and the continuous line the sensing of salt water (with a concentration of one fourth of a saturated solution. A frequency sweep was carried out from 5 MHz to 6.2 MHz in 255 steps. The rise in frequency was 123 Hz per millisecond. The frequency response was read out on an oscilloscope.

In case of air, the secondary circuit is not connected, as there is no electric field between the primary and the secondary circuit. Hence, no energy is absorbed by the secondary circuit via inductive coupling. The response of the sensor is the frequency response of the primary circuit, and the resonance frequency is 5.68 MHz. In case that the siphon is filled with tap water, the resonance frequency (of the primary circuit) reduces to 5.52 MHz. Furthermore, a minimum occurs at 5.88 MHz, which is caused by the resonance frequency of the secondary circuit, including the inductor, the electrodes and the liquid.

In case of a salt solution, the resonance of the primary circuit is reduced further. The first maximum is found at 5.28 MHz, with a magnitude of 1.3, whereas the magnitude was 2.2 in the case of air. An additional peak in the resonance is observed at 5.95 MHz. Furthermore, resonance of the secondary circuit is shifted (relative to the case of tap water) from 5.88 MHz down to 5.47 MHz. This reduction in frequency corresponds with an increased effect of the capacitance. The signal magnitude of the minimum is even lower (0.15 versus 0.3), which is due to the higher conductivity of the water. It is observed for sake of completeness, that in this embodiment of interdigitated electrodes, the resonance frequency is suitably in the range of 0.2-0.6 times the center frequency of the voltage controlled oscillator, such as below 0.5 times said center frequency.

It is furthermore observed that this electrode configuration of interdigitated electrodes may be suitably applied for the determination of a height of a water surface, in accordance with a further aspect of the invention, such as described hereinabove. It is deemed particularly suitable to use such interdigitated electrodes in a design that is 90 degrees rotated relative to the configuration shown in FIG. 7. Particularly, the fingers of said electrodes would extend from top to bottom or vice versa, and the first electrode would be on the bottom side, at least substantially below the water surface, whereas the second electrode would be on the op side, at least partially above the water surface in the first, reference state.

FIG. 8 shows a system 250 for a tube 131, 132 configured for relatively high conductivity of the aqueous solution. The first and the second electrodes 101, 102 herein are ring-shaped, wherein the first electrode 101 is arranged upstream of the second electrode 102. The electrodes 101, 102 are herein shown to constitute a closed ring, but it is not excluded that such ring would be opened, i.e. the electrodes 101, 102 extend only over at least 270 degrees of the maximum 360 degrees.

FIG. 9 shows a system 251 for a tube 131, 132 configured for a relatively low conductivity of the aqueous solution. The first and second electrodes 141, 142 have a substantially rectangular shape, with a larger dimension in the axial direction than in the angular direction. The first and second electrode 141 are moreover arranged so as to be opposed to each other. It evidently goes without saying that the one electrode 141 may extend further than the other. Furthermore, rather than a single first electrode 141 and a single second electrode 142, a plurality of first electrodes 141 and second electrodes 142 could be present, for instance arranged around the tube segment 130 in an alternating arrangement.

In the embodiments illustrated in FIG. 8 and in FIG. 9, a tube segment 130 is shown that is present between the tube segments 131, 132. Thus, herein, an original tube 131, 132 is to be opened and a separate 'sensor tube segment' 130 is positioned between the tube segments 131, 132. The sensor tube segment 130 may be coupled to the other tube segments 131, 132 in known manner. One typical connector is a shell. While the interconnects between the electrodes 101, 141, 102, 142 and the box 105 are herein shown as wires, they may be implemented in other manners, such as conductor tracks on a printed circuit board or conductor tracks integrated into a element formed by moulding. In case of using wires, it is deemed preferable to protect these by means of a housing or by means of applying an encapsulating material. While the mere shown difference between the systems 250 and 251 relates to the configuration of the electrodes of the capacitive sensor, it is observed that other elements of the sensor circuit as present in the box 105 may be different as well. In one implementation, the inductors of the systems would have a different magnitude. In another implementation, the circuit is configured for a different resonance frequency.

FIG. 10 schematically shows an embodiment of a sanitary appliance 400. Rather than that the first electrode 101 and the second electrode 102 are arranged below the water surface 1001, the second electrode 102 is deliberately arranged so as to have an aired area 191 extending above the water surface 1001 and an underwater area extending below the water surface 1001. It is understood that with an increasing water level, the mutual size of the aired area 191 and the underwater area 192 may change. The illustrated sanitary appliance 400 is a toilet comprising a receptacle 410, a removal pipe 430, typically including a siphon, and a tube or chamber 420 configured so that a water surface 1001 is present therein during use. The sanitary appliance is provided with a front wall 401 and a rear wall 402 that are mutually connected together in known manner. The shapes of said front wall 401 and rear wall 402 define the receptacle 410 and the water chamber 420. The rear wall 402 herein extends into the water chamber 420, so that water flowing from the receptacle 410 into the tube 430 has to flow beneath the rear wall 402, preventing that bad odors would migrate from the tube 430 to the receptacle 410 and into the air. In the shown embodiment, the first electrode 101 is arranged substantially below the rear wall 402. Alternatively, the first electrode could be arranged on the rear wall 402, but below the water surface 1001. The second electrode 102 is arranged in the water chamber 420 on the side of the receptacle 410, typically on the front wall 401. In again a further alternative, the first electrode 101 is located on the front wall 401 but rather at the side of the receptacle 410 too. It is deemed preferable that the first and the second electrodes 101, 102 are not in direct contact with the water flowing the sanitary appliance (i.e. not located on the flow surface), but rather be placed on an outside of the walls 401, 402 of the sanitary appliance (with the wall being present between the electrode and the flow surface). Instead of being arranged on an outside of the wall, an electrode may be arranged in a capacity within said wall or may be embedded in said wall.

When liquid matter flows into the receptacle 410 and then is added into the water of the water chamber 420, it will likely flow along the surface of the front wall 401 or the rear wall 402. As a consequence, the water surface 1001 will not or not substantially be moved in location. When however solid matter flows into the receptacle 410, it will rather fall into the water in the water chamber 420. A kind of shock wave will then be generated in the water surface 1001. This will have an impact on the location of the water surface 1001 at the second electrode 102, more particularly creating an increase and a subsequent decrease of the water surface 1001. The water will then cover at least part of the aired area 491 of the second electrode 102, resulting in a higher conductivity during the period of an increase of the water surface. During a subsequent decrease of the water surface, the conductivity will drop again. This change in conductivity can be identified. It is deemed preferable that the change in conductivity is amplified, in the sense that the change leads to a higher or a lower degree of resonance. Under such conditions, the effectively sensed increase in the output signal is more than only the mere increase in capacitance due to the added electrode area. One preferred way of creating this variation in the degree of resonance is by using the sensor circuit as discussed with reference to FIGS. 2 and 3.

FIGS. 12(a) and 12(b) diagrammatically show the sensing of a level of the water surface 1001 on top of liquid 1000 by means of the first and the second capacitor electrodes 101, 102, in accordance with one embodiment. For sake of simplicity, the primary circuit is not shown in FIGS. 12(a) and 12(b), except for the primary inductor Lp. The secondary circuit S2 is diagrammatically shown. It includes a secondary inductor (named Ls in FIG. 2), as well as the capacitor electrodes 101, 102, which constitutes a capacitor with any intermediate liquid 1000 (typically water or a salt solution). In the illustrated embodiment, the first electrode 101 is arranged at a bottom of the tube, whereas the second electrode 102 is arranged at a side wall of the tube.

FIG. 12(a) shows the tube in a first reference state. Herein, the water surface 1001 is at a low level. As a consequence, the second electrode is at least partially, and in this illustrated embodiment for about 30% below the water surface 1001 and about 70% above the water surface 1001. As the air does not contribute substantially to the capacitance, the effective capacitance is defined by the 30% of the second electrode 102. An electric field with limited strength develops through the liquid 1000.

FIG. 12(b) shows the tube in a second state. Herein, the water surface 1002 is at a high level. In the illustrated embodiment, the second electrode is for about 90% below the water surface and 10% above the water surface. As a consequence, the effective area of the second electrode 102 is much larger than in the first state, and the field is stronger as indicated by a larger number of field lines running through the liquid 1000.

Figure 13A:
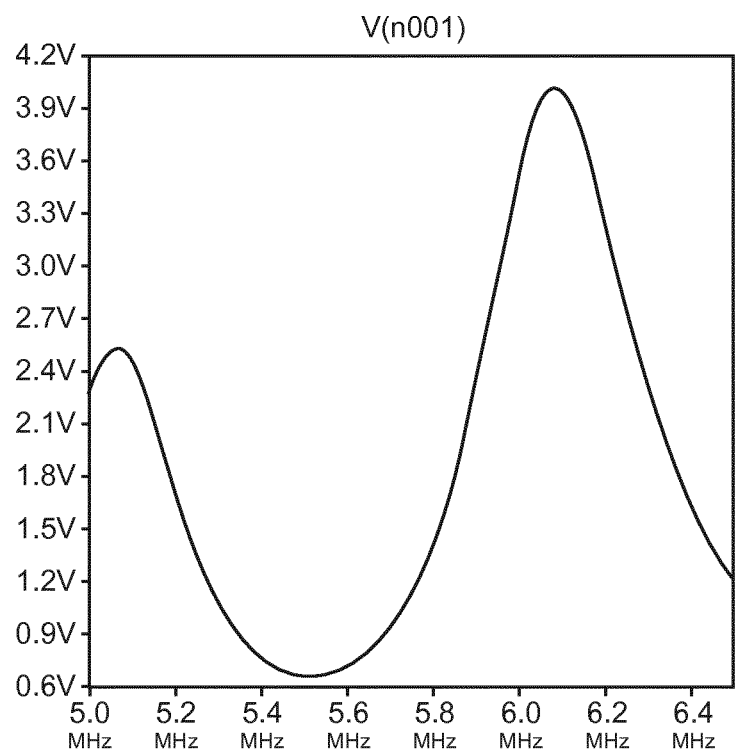
Figure 13B:
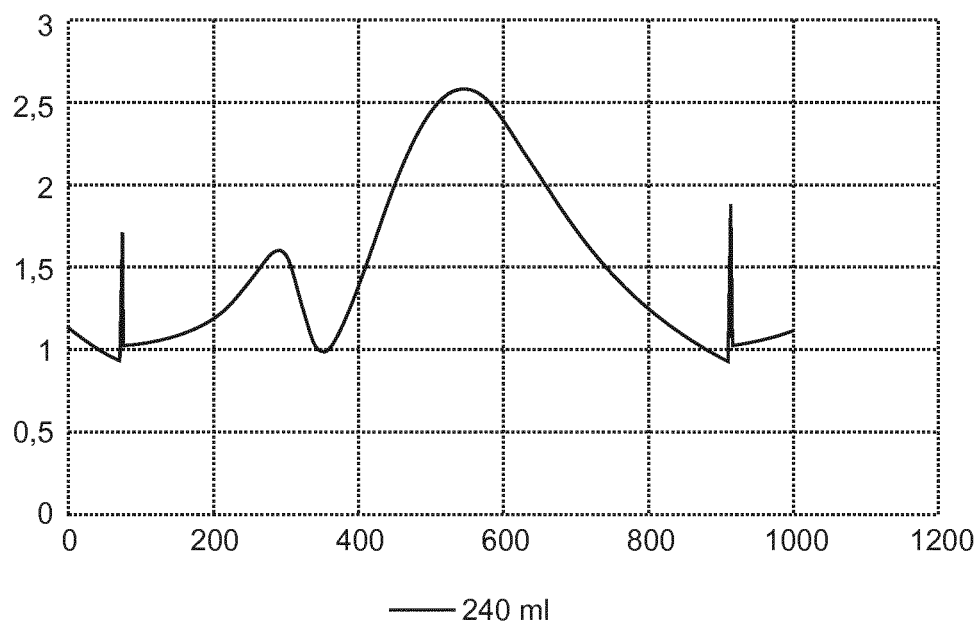
Figure 13C:
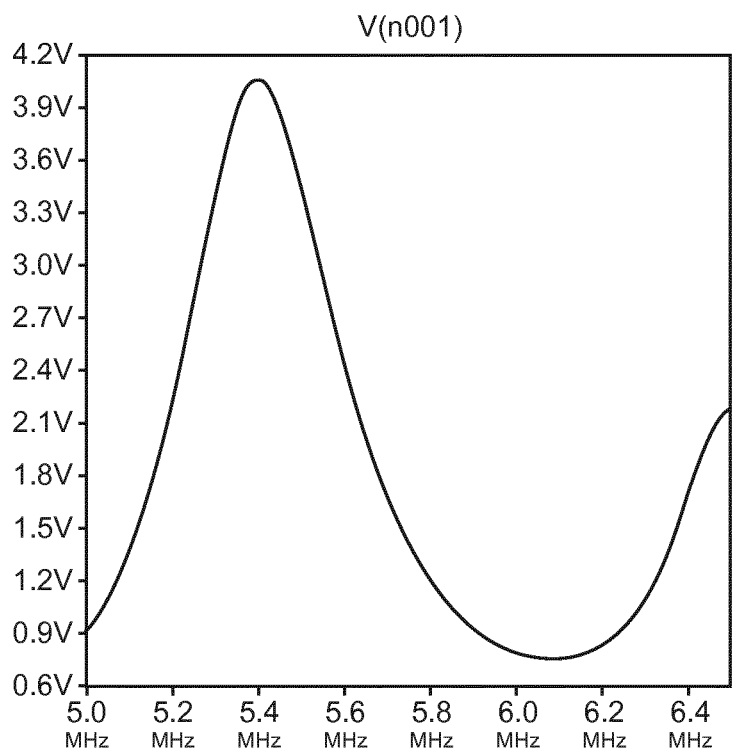
Figure 13D:
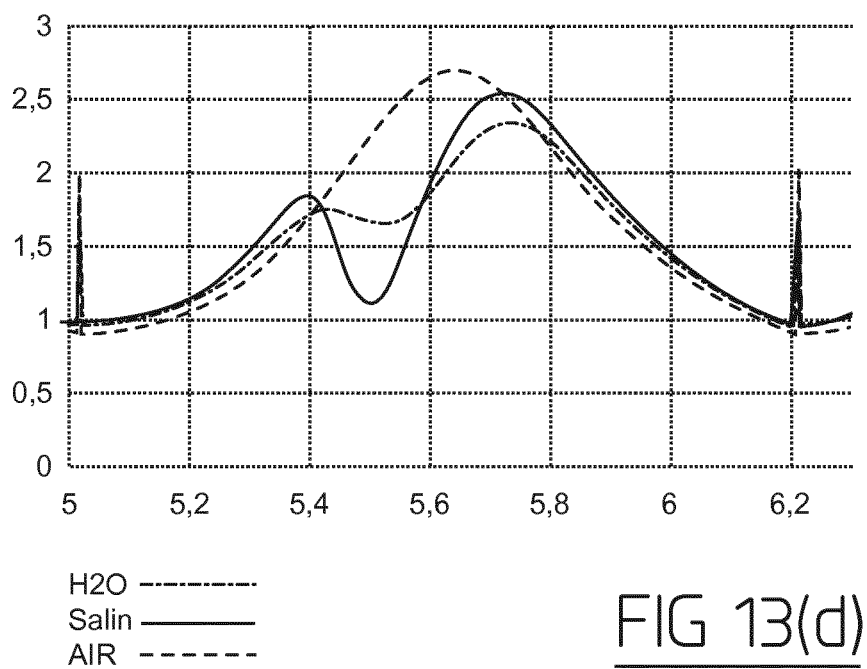

FIG. 13(a)-(d) shows a series of graphs based on the circuit of the invention. FIGS. 16(a) and 13(c) are based on simulations, FIG. 13(b) is a graphs based on measurements with a circuit corresponding to FIG. 13(a). In FIG. 13(b), the x-as specified the volume of added saline. In FIG. 13(d), this is converted into frequency. FIG. 13(d) shows graphs for water and air in addition to that of saline.

FIG. 13(a) shows the response of the circuit as a function of the frequency during a frequency sweep. The response is given in voltages. The scale on the y-axis runs from 0.6V to 4.2V. The scale on the x-axis runs from 5.0 to 6.4 MHz. The graph includes a first and a second maximum at about 5.1 MHz and about 6.1 MHz and a minimum at 5.55 MHz. The graph is to be understood as a superposition of a resonance graph for the primary circuit (with a maximum most likely between 5.8 and 6.0 MHz) and a dip due to absorption of energy into the secondary circuit. The minimum thereof is 5.55 MHz, which corresponds to the resonance frequency of the secondary circuit. The measurement is done using the component values as specified in relation to FIG. 4 above, with $Rp=10^5$ ohm, $Cp1=150$ pF, $Cp2=180$ pF and $Cs=27$ pF. The capacitance of the secondary circuit is an estimate a measurement with a salt solution.

FIG. 13(c) shows the response of the same circuit, for the case that the capacitance of the secondary circuit is only 5 pF. This is a smaller capacitance and thus corresponds to a lower electrolyte concentration. The capacitances Cp1 and Cp2 have been decreased to 56 pF and 68 pF respectively, Rp was 200 ohm. The result is a shift in the resonance frequency of the secondary circuit to 6.1 MHz. The response therefore now includes a maximum. This occurs at about 5.4 MHz. This graph indicates that the circuit is feasible of measuring different concentrations, but also of being optimized to different concentrations.

FIG. 13(b) shows the experimental response. Herein the same pattern is visible as in FIG. 16(a), although the amplitudes are less high: the first maximum reaches 1.6V (rather than 2.2V). The minimum is at 1.0V (rather than 0.6V) and the second maximum reaches 2.6V (rather than 4.0V).

FIG. 13(d) shows the same graph as in FIG. 16(b), but now with the x-axis converted to frequencies. A line is added corresponding to a measurement on air (maximum at 5.65 MHz). This line has the shape of a sine-curve and demonstrates that no energy is absorption in the secondary circuit. A further line is adde corresponding to a measurement with pure water rather than with saline. It is visible that this line includes merely a small dip, corresponding to a small energy absorption into the secondary circuit.

FIG. 14 shows an electric diagram of a prior art circuit for measurement of a liquid level in a closed container as known from EP0750181A1. Said patent application relates to measurement of a liquid level in a liquid container containing an anaesthetic liquid. In the example of EP0750181A1, the said liquid is sevoflurane, which is a non-polar organic liquid (an fluorized ether compound). Based on the values given in the said patent application, it was calculated that the relative dielectric constant of this sevoflurane is about 5, which is quite long. It is therefore highly questionable that the said liquid is an electrolyte solution. In accordance with the data in EP0750181, L2 was set to 10 μH. R1 was chosen as $10^6$ Ohm. Alternating current (3V3) and R3 (1100V) were estimated so as to be comparable to those used in the simulations for FIGS. 13(a) and (c). The coupling factor was chosen to be 0.2, which corresponds to the value used for the graphs in FIGS. 13(a) and (c), which was 0.17.

Figure 15A:
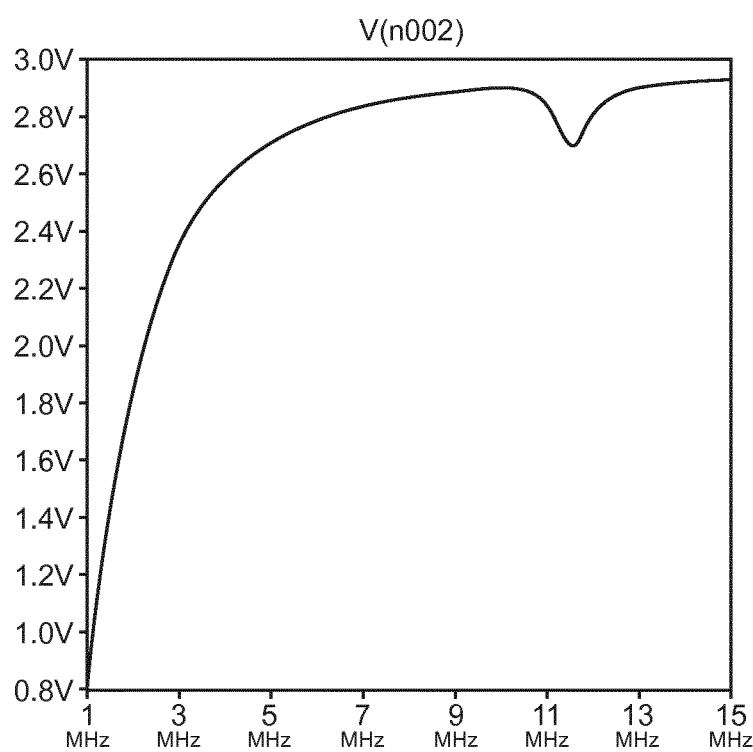

FIG. 15(a) shows the result for the case wherein L1 is 10 μH (as L2) and C1 is 20 pF. This is a situation that corresponds to saline. The conductivity was 18 mS. This corresponds to a NaCl-concentration of 1.0 wt % or 10 g/liter. The 20 pF corresponds to the situation wherein the container is empty. Here, the effect is that a very small dip is visible in the resonance curve, i.e. going down from 2.9V to 2.7V at a resonance frequency of about 12 MHz.

Figure 15B:
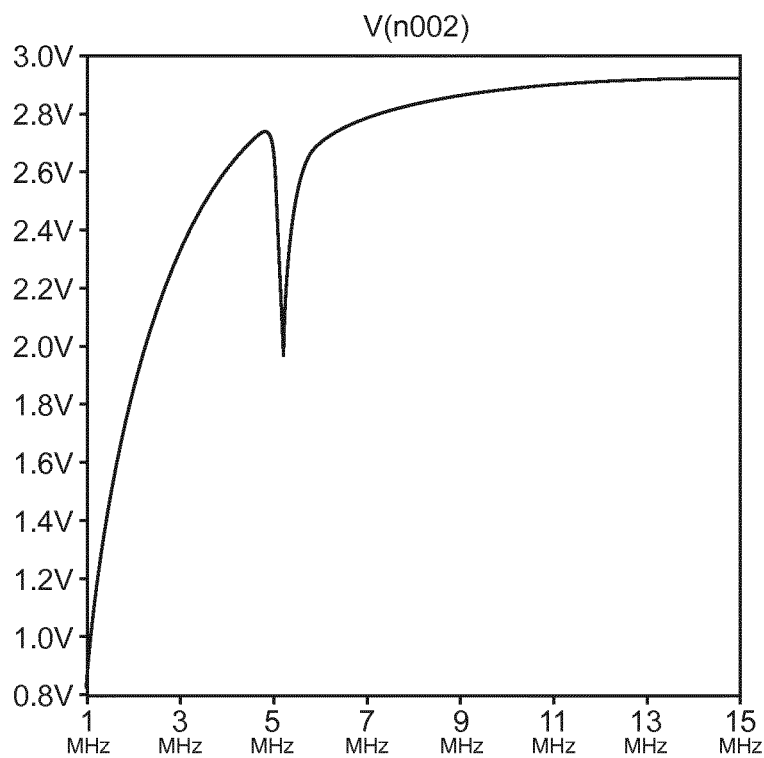

FIG. 15(b) shows the result for the case wherein the capacitance C1 of the secondary circuit was 98 pF. This corresponds to the situation wherein the container was filled with salt solution. Now, a dip is visible in the resonance curve from 2.8 to 2.0V. However, the dip is present at a completely different frequency, namely about 5 MHz. This complicates identifying the dip by means of a frequency sweep. Furthermore, the dip is very narrow. When signal to noise ratio reduces, it may be absorbed.

Figure 15C:
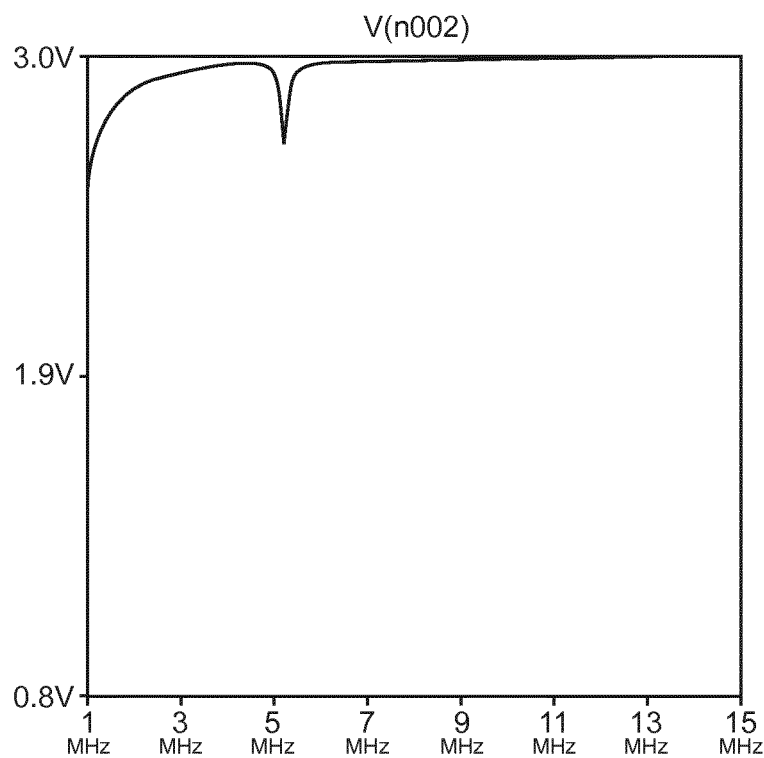

FIG. 15(c) shows the result for the case as in FIG. 18(b) with a capacitance C1 of 98 pF. However, in this case, the inductance L1 was increased from 10 to 40 μH. It is visible that the dip shrinks, from 2.9 to 2.7 V.

Figure 15D:
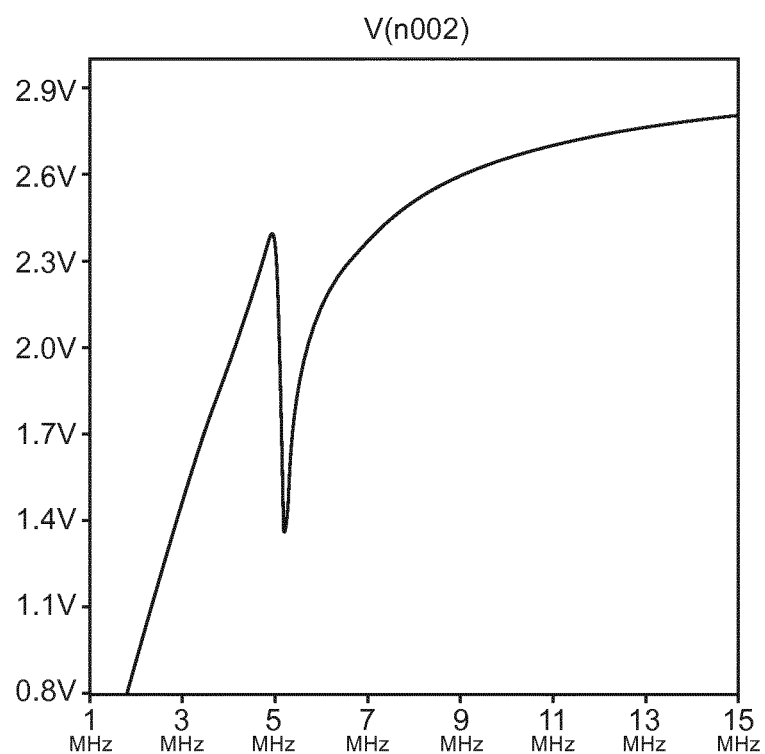

FIG. 15(d) shows the result for the case as in FIGS. 18(b) and (c) with a capacitance C1 of 98 pF. However, in this case, the inductance L1 was decreased to 5 μH. This enhances the dip, from 2.4 to 1.4V.

It is observed for sake of clarity that the coupling factor of 0.2 was chosen so as to be comparable to the situation in the invention. There is however no indication in EP0750181 that such coupling factor was used. Rather a higher coupling factor is more likely. Calculations with variation of the coupling factor are shown in Table 1. It is visible that the resonance frequency is highly dependent on both the capacitance of the secondary circuit and the coupling factor between the inductors. The voltage differences at these resonance frequencies were only about 50-80 mV, which is not big. All in all, this renders it very difficult to arrive at a robust sensor system for an electrolyte solution.

TABLE 1

| calculations on resonance frequency in prior art system | | |
| --- | --- | --- |
| Coupling factor K | Capacitance C1 (pF) | $F_{res}$ (MHz) |
| 0.2 | 96 | 5.2 |
| 0.8 | 96 | 8.3 |
| 0.2 | 20 | 11.5 |
| 0.8 | 20 | 19 |

The invention claimed is:

1. A sanitary appliance comprising a tube or chamber provided with a tube wall and configured to contain in use an aqueous solution and a sensor circuit for sensing inflow of matter into the sanitary appliance,
wherein:
the sensor circuit comprises a primary circuit and a secondary circuit that are mutually inductively coupled,
the primary circuit comprises a resonant tank circuit comprising at least one capacitor and an inductor coupled in parallel to ground, wherein the secondary circuit is coupled to the primary circuit via the inductor of the resonant tank circuit, and
the inductively coupled secondary circuit includes a capacitive sensor comprising a first electrode and a second electrode, wherein in use the aqueous solution constitutes a medium of the capacitive sensor.

2. A sanitary appliance according to claim 1, wherein the primary circuit of the sensor circuit comprises an output circuit for conditioning a response transmitted from the capacitive sensor into an output signal.

3. A sanitary appliance according to claim 2, wherein the primary circuit comprises a signal generator configured for generating signals in a predefined frequency range above 1 MHz, wherein a sensing event may be formed by a series of signals.

4. A sanitary appliance according to claim 1, wherein the primary circuit comprises a signal generator configured for generating signals in a predefined frequency range above 1 MHz, wherein a sensing event may be formed by a series of signals.

5. A sanitary appliance according to claim 4, wherein the signal generator comprises a voltage controlled oscillator, and wherein the resonant tank circuit is configured to have at least one of a resonance frequency that is lower than a center frequency of the voltage controlled oscillator and a resonance frequency of 0.2-0.9 times the center frequency of the voltage controlled oscillator.

6. A sanitary appliance according to claim 1, wherein the resonant tank circuit of the primary circuit is configured to have a quality factor in a range of 1-50.

7. A sanitary appliance according to claim 1, wherein the resonant tank circuit in the primary circuit is configured to have a resonance frequency and the secondary circuit is configured to have a resonance frequency defined at a predefined electrical conductivity of the aqueous solution, wherein a ratio of the resonance frequencies of the resonant tank circuit and the secondary circuit is in a range of 0.5 to 2.0.

8. A sanitary appliance according to claim 1, wherein the primary circuit and the secondary circuit are mutually inductively coupled with a coupling factor in a range of 0.05 to 0.3.

9. A sanitary appliance according to claim 8, wherein the secondary circuit comprises an inductor in addition to the capacitive sensor, which inductor is configured for the inductive coupling, which inductor and which capacitive sensor jointly constitute a resonant tank at a predefined concentration of the aqueous solution.

10. A sanitary appliance according to claim 1, wherein the secondary circuit comprises an inductor in addition to the capacitive sensor, which inductor is configured for the inductive coupling, which inductor and which capacitive sensor jointly constitute a resonant tank at a predefined concentration of the aqueous solution.

11. A sanitary appliance according to claim 1, wherein the first and second electrodes are arranged so as to be separated in use from the aqueous solution by means of a protective layer.

12. A sanitary appliance according to claim 11, wherein the tube wall or part thereof constitutes the protective layer.

13. A sanitary appliance according to claim 11, wherein the first and second electrodes are arranged and configured so as to sense a variation of a location of a water surface adjacent the tube wall, relative to a reference location.

14. A sanitary appliance according to claim 1, wherein the first and second electrodes are arranged and configured so as to sense a variation of a location of a water surface adjacent the tube wall, relative to a reference location.

15. A sanitary appliance according to claim 1, wherein the first electrode and the second electrode are arranged and configured to sense electrical conductivity of the aqueous solution and/or changes therein.

16. A method of using a sensor circuit to sense electrical conductivity of an aqueous solution in a sanitary appliance or a variation in the electrical conductivity, the method comprising:
sensing by the sensor circuit an electrical conductivity of an aqueous solution in a sanitary appliance based on a signal generated by a signal generator or a variation in the electrical conductivity of the aqueous solution, wherein:
the sensor circuit includes:
a primary circuit including the signal generator,
a secondary circuit that is inductively coupled to the primary circuit and that includes a capacitive sensor having a first and second electrode, and
an output circuit for conditioning a response transmitted from the secondary circuit into an output signal indicative of sensed electrical conductivity or indicative of the variation in the electrical conductivity,
the aqueous solution constitutes a medium of the capacitive sensor,
the primary circuit comprises a resonant tank circuit comprising at least one capacitor and an inductor coupled in parallel to ground, and
the secondary circuit is coupled to the primary circuit via the inductor of the resonant tank circuit.

17. A method according to claim 16, further comprising:
generating one or more sensing signals in the primary circuit;
transmitting the one or more sensing signals to the secondary circuit via inductive coupling, wherein a signal transmission to the secondary circuit has an effectiveness dependent on the electrical conductivity of the aqueous solution, thus defining a response, wherein the signal transmission is carried out with a coupling factor in a range of 0.05 to 0.3, and
conditioning the response transmitted from the secondary circuit into the output signal.

18. A method of using a sensor circuit in a sanitary appliance, the sanitary appliance comprising a tube or chamber that has a tube wall and that is configured for keeping an aqueous solution with a water surface, the method comprising:
sensing by the sensor circuit a variation of a location of the water surface adjacent the tube wall, relative to a reference location, wherein:
the sensor circuit includes:
a primary circuit including a signal generator configured for generating sensing signals,
a secondary circuit that is inductively coupled to the primary circuit and that includes a capacitive sensor having a first and a second electrode, and
an output circuit for conditioning a response transmitted from the secondary circuit into an output signal indicative of the variation of the location of the water surface adjacent the tube wall, relative to the reference location,
the aqueous solution constitutes a medium of the capacitive sensor,
the primary circuit comprises a resonant tank circuit comprising at least one capacitor and an inductor coupled in parallel to ground, and
the secondary circuit is coupled to the primary circuit via the inductor of the resonant tank circuit.

19. A method according to claim 18, wherein:
the sensor circuit is configured for sensing transient variations in the location of the water surface adjacent the tube wall, and
the method further comprises:
sensing transient variations in the location of the water surface adjacent the tube wall.

20. A method according to claim 18, further comprising:
generating one or more sensing signals in the primary circuit;
transmitting the one or more sensing signals to the secondary circuit via inductive coupling, wherein a signal transmission to the secondary circuit has an effectiveness dependent on an electrical conductivity of the aqueous solution, thus defining a response, wherein the signal transmission is carried out with a coupling factor in a range of 0.05 to 0.3, and
conditioning the response transmitted from the secondary circuit into the output signal.

* * * * *